US011385715B2

(12) United States Patent
Tsunoda et al.

(10) Patent No.: US 11,385,715 B2
(45) Date of Patent: Jul. 12, 2022

(54) NON-CONTACT OPERATING APPARATUS FOR VEHICLE AND VEHICLE

(71) Applicant: SUBARU CORPORATION, Tokyo (JP)

(72) Inventors: Takashi Tsunoda, Tokyo (JP); Hideyuki Sase, Tokyo (JP); Takemi Oguri, Tokyo (JP); Tomoyuki Kitamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 77 days.

(21) Appl. No.: 16/751,382

(22) Filed: Jan. 24, 2020

(65) Prior Publication Data

US 2020/0310546 A1    Oct. 1, 2020

(30) Foreign Application Priority Data

Mar. 27, 2019    (JP) .............................. JP2019-060596

(51) Int. Cl.
*G06F 3/01* (2006.01)
*B60K 35/00* (2006.01)
*B60R 1/00* (2022.01)

(52) U.S. Cl.
CPC .............. *G06F 3/016* (2013.01); *B60K 35/00* (2013.01); *B60R 1/00* (2013.01); *G06F 3/011* (2013.01); *B60K 2370/152* (2019.05); *B60K 2370/157* (2019.05); *B60R 2300/107* (2013.01); *B60R 2300/20* (2013.01); *B60R 2300/30* (2013.01)

(58) Field of Classification Search
None
See application file for complete search history.

(56) References Cited

U.S. PATENT DOCUMENTS

| 2018/0210551 A1 | 7/2018 | Kitagawa |
| 2019/0088024 A1* | 3/2019 | Kobayashi ................ G06T 7/73 |
| 2020/0073520 A1* | 3/2020 | Mohan ................ G06Q 30/0235 |
| 2020/0258314 A1* | 8/2020 | Nonoyama ............. G06F 3/013 |

FOREIGN PATENT DOCUMENTS

JP    2017-027401 A    2/2017

* cited by examiner

*Primary Examiner* — Nicholas J Lee
(74) *Attorney, Agent, or Firm* — Troutman Pepper Hamilton Sanders LLP

(57) ABSTRACT

A non-contact operating apparatus, for a vehicle, includes a generating unit, a projecting device, a detecting device, a stimulation output device, a determining unit, and a stimulation response output unit. The generating unit is configured to generate and update image containing an image object. The projecting device is configured to project the image in a predetermined display region. The detecting device is configured to detect an operation site of an occupant positioned in a vicinity of the predetermined display region. The stimulation output device is configured to output and update a tactile stimulation to the operation site. The determining unit is configured to determine whether the operation site performs a non-contact operation against the image object. The stimulation response output unit is configured to cause the stimulation output device to output the tactile stimulation to the operation site on the basis of a determination result.

16 Claims, 8 Drawing Sheets

NON-CONTACT OPERATING APPARATUS FOR VEHICLE AND VEHICLE

CROSS-REFERENCE TO RELATED APPLICATIONS

The present application claims priority from Japanese Patent Application No. 2019-060596 filed on Mar. 27, 2019, the entire contents of which are hereby incorporated by reference.

BACKGROUND

The technology relates to a non-contact operating apparatus for a vehicle and a vehicle.

Various kinds of operating members are provided in a vehicle. For example, a start switch, a handle, a shift lever, and a pedal for controlling traveling of the vehicle are provided in the vicinity of a driver's seat in the vehicle. Further, operating members for an air conditioner, a navigation apparatus, an audio device, an image receiving device, a handsfree calling device, and other equipment devices are provided in the vehicle. Thus, a large number of operating members are provided in the vehicle. The large number of operating members may be laid out on an inner surface of a vehicle compartment. In recent years, however, the inner surface for layout in the vehicle compartment tends to become insufficient. For example, in a case where it is considered that a game machine, a network communication device, an entertainment device, or any other device may be added thereto, there is a possibility that operating members for these devices cannot further be added in the future.

In particular, for a vehicle, development of an automatic driving technology has advanced. In a case where the development of the automatic driving technology advances actually and the vehicle can travel autonomously without an occupant directly controlling traveling of the vehicle, the occupant may ride the vehicle in a state where a seat is reclined, for example. In this case, when the occupant wants to operate any operating apparatus, the occupant is required to rise from the seat for an operation and stretch his or her arm to the corresponding operating member laid out on the inner surface of the vehicle compartment to operate the operating member.

As disclosed in Japanese Unexamined Patent Application Publication (JP-A) No. 2017-027401, development of a new operating apparatus directed to operating of an image projected in a vehicle compartment of the vehicle has been required for the vehicle.

SUMMARY

An aspect of the technology provides a non-contact operating apparatus for a vehicle. The apparatus includes a generating unit, a projecting device, a detecting device, a stimulation output device, a determining unit, and a stimulation response output unit. The generating unit is configured to generate and update image containing an image object. The projecting device is configured to project the image in a predetermined display region within a vehicle compartment of a vehicle. The detecting device is configured to detect an operation site of an occupant positioned in a vicinity of the predetermined display region in the vehicle compartment. The stimulation output device is configured to output a tactile stimulation based on an ultrasound field to the operation site of the occupant. The determining unit is configured to determine whether the operation site of the occupant detected by the detecting device performs a non-contact operation against the image object to output a determination result as operational information. The stimulation response output unit is configured to cause the stimulation output device to output, on the basis of the determination result, the tactile stimulation to the operation site of the occupant as a response to the operation. The occupant performs the non-contact operation against the image object. The generating unit and the stimulation response output unit are configured to respectively update the image object and output of the tactile stimulation in accordance with the operational information.

An aspect of the technology provides a vehicle. The vehicle includes a non-contact operating apparatus, a control device, and a communication device. The non-contact operating apparatus includes a generating unit, a projecting device, a detecting device, a stimulation output device, a determining unit, and a stimulation response output unit. The generating unit is configured to generate and update image containing an image object. The projecting device is configured to project the image in a predetermined display region within a vehicle compartment of a vehicle. The detecting device is configured to detect an operation site of an occupant positioned in a vicinity of the predetermined display region in the vehicle compartment. The stimulation output device is configured to output a tactile stimulation based on an ultrasound field to the operation site of the occupant. The determining unit is configured to determine whether the operation site of the occupant detected by the detecting device performs a non-contact operation against the image object to output a determination result as operational information. The stimulation response output unit is configured to cause the stimulation output device to output, on the basis of the determination result, the tactile stimulation to the operation site of the occupant as a response to the operation. The occupant performs the non-contact operation against the image object. The generating unit and the stimulation response output unit are configured to respectively update the image object and output of the tactile stimulation in accordance with the operational information. The control device is coupled to the non-contact operating apparatus through an internal network. The control device is configured to control an operation of the vehicle. The communication device is coupled to the non-contact operating apparatus through the internal network. The communication device is configured to communicate with an outside of the vehicle. The non-contact operating apparatus is configured to project content received by the communication device as the image.

An aspect of the technology provides a non-contact operating apparatus for a vehicle. The apparatus includes circuitry, a projecting device, a detecting device, and a stimulation output device. The circuitry is configured to control an operation of the non-contact operating apparatus. The projecting device is configured to project image in a predetermined display region within a vehicle compartment of a vehicle. The image contains an image object. The detecting device is configured to detect an operation site of an occupant positioned in a vicinity of the predetermined display region in the vehicle compartment. The stimulation output device is configured to output a tactile stimulation based on an ultrasound field to the operation site of the occupant. The circuitry is configured to generate and update the image. The circuitry is configured to determine whether the operation site of the occupant detected by the detecting device performs a non-contact operation against the image object to output a determination result as operational information. The circuitry is configured to cause the stimulation output device to output, on the basis of the determination result, the tactile stimulation to the operation site of the occupant as a response to the operation. The occupant performs the non-contact operation against the image object. The circuitry is configured to update the image object and output of the tactile stimulation in accordance with the operational information.

BRIEF DESCRIPTION OF THE DRAWINGS

The accompanying drawings are included to provide a further understanding of the disclosure, and are incorporated in and constitute a part of this specification. The drawings illustrate some example embodiments and, together with the specification, serve to explain the principles of the disclosure.

DETAILED DESCRIPTION

Figure 1A:
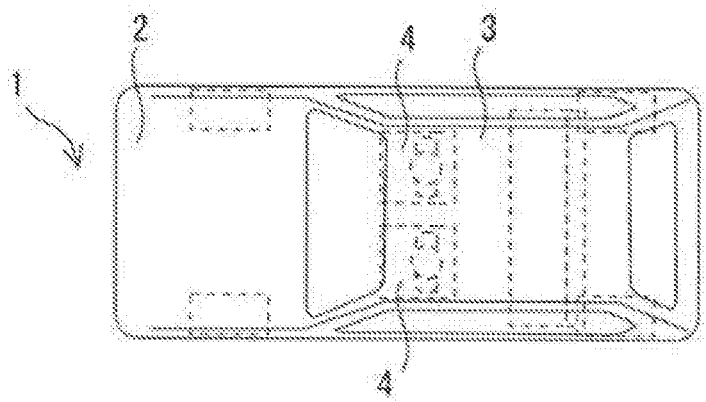
FIGS. 1A to 1C are each a schematic explanatory diagram of an example of a vehicle according to one example embodiment of the technology.

Hereinafter, some example embodiments of the technology will be described with reference to the drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

An operating apparatus for a vehicle disclosed in JP-A No. 2017-027401 described above presents an image (including an image object) to an occupant, and outputs a tactile stimulation of an ultrasound field to an operation site of the occupant in response to an operation of the occupant against the presented image object. For this reason, the occupant is allowed to obtain an actual sensation as if the occupant operates the image object.

However, the operating apparatus of JP-A No. 2017-027401 makes the tactile stimulation strong or weak in accordance with a movement direction of the operation site. The tactile stimulation does not correspond to image itself or variation in the image object. As a result, for example, since variation in the tactile stimulation does not correspond to the variation in the image object, there is a possibility that a feeling of strangeness occurs due to a difference or a gap between a sensation received from a visual sensation and a sensation received from the tactile sensation.

Thus, in order to resolve the feeling of strangeness described above, it has been required to improve the operating apparatus for a vehicle.

First Example Embodiment

FIG. 1 is a schematic explanatory diagram of a vehicle 1 according to a first example embodiment of the technology.

FIG. 1A is a top view of the vehicle 1. Each of FIG. 1B and FIG. 1C is a side view of the vehicle 1.

Figure 1B:
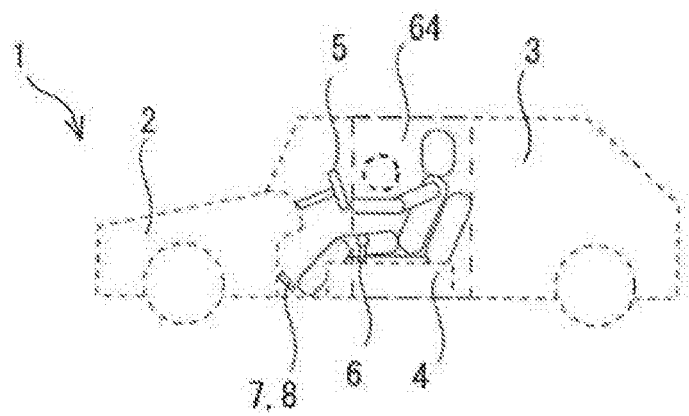
Figure 1C:
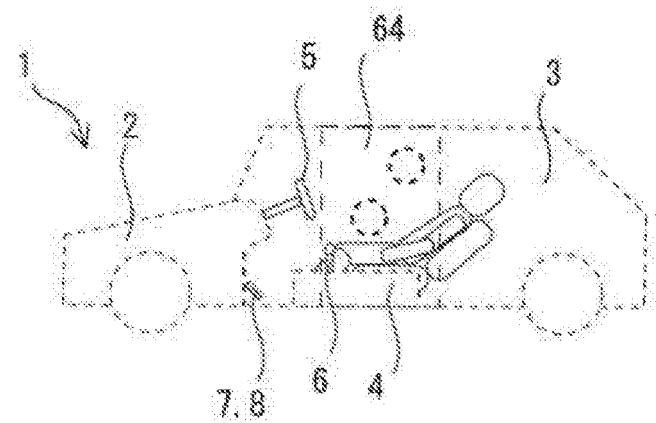

The vehicle 1 illustrated in FIGS. 1A to 1C is one example of a vehicle. The vehicle 1 may have a vehicle body 2. A vehicle compartment 3 may be provided in the vehicle body 2. One or more occupants may be allowed to get into the vehicle compartment 3. A plurality of seats 4 on each of which the occupant sits may be provided in the vehicle compartment 3. A handle 5, a shift lever 6, a brake pedal 7, and an accelerator pedal 8 may be provided in a front portion of the vehicle compartment 3 as operating members in order for the occupant, particularly a driver to operate them for traveling of the vehicle 1. As illustrated in FIG. 1B, the driver may be allowed to operate the operating members such as the handle 5 while sitting on the seat 4.

Further, as illustrated in FIG. 1B and FIG. 1C, a hollow square frame body 64 of a stimulation output device 45, which will be described later, is provided in the vehicle compartment 3.

Figure 2:
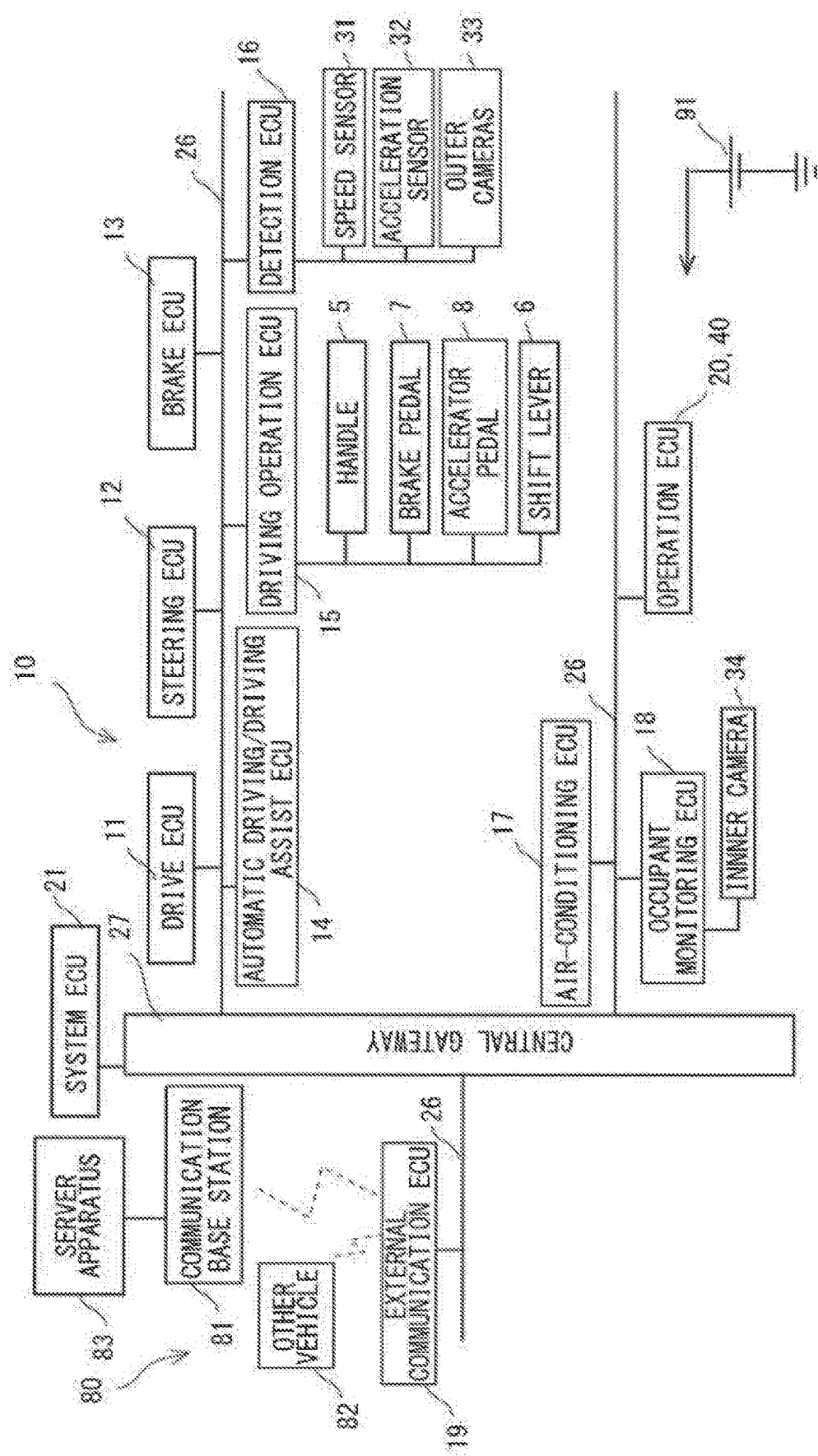
FIG. 2 is a schematic explanatory diagram of an example a control system in the vehicle illustrated in FIG. 1.

FIG. 2 is a schematic explanatory diagram of a control system 10 in the vehicle 1 illustrated in FIG. 1. FIG. 2 illustrates a plurality of control devices that may be included in the control system 10 as represented by control electronic control unit (ECUs) respectively incorporated in the plurality of control devices.

In a specific but non-limiting example, FIG. 2 illustrates a drive ECU 11, a steering ECU 12, a brake ECU 13, an automatic driving/driving assist ECU 14, a driving operation ECU 15, a detection ECU 16, an air-conditioning ECU 17, an occupant monitoring ECU 18, an external communication ECU 19, an operation ECU 20 as a non-contact operating apparatus 40, and a system ECU 21. For example, a vehicle network (internal network) 26 such as a controller area network (CAN) or a local interconnect network (LIN) may be adopted in the vehicle 1. The above-described control ECUs may be coupled to a central gateway (CGW) 27 via the vehicle network 26. The central gateway 27 may serve as a relay apparatus.

In each of control modules, the corresponding control ECU may be coupled to at least one electronic device used in the vehicle 1. When activated, each control ECU may execute various kinds of processes to control an operation of the electronic device coupled to the corresponding control ECU on the basis of information or data acquired from the vehicle network 26. Further, each control ECU may output information or data such as an operation state of the corresponding electronic device to the vehicle network 26.

For example, unillustrated operation detecting sensors for devices, such as the handle 5, the brake pedal 7, the accelerator pedal 8, or the shift lever 6, which the occupant operates to control the traveling of the vehicle 1, may be coupled to the driving operation ECU 15. The driving operation ECU 15 may output control information based on an operation amount detected by each of the operation detecting sensors to the vehicle network 26. The drive ECU 11, the steering ECU 12, and the brake ECU 13 may acquire necessary information from the vehicle network 26, and control the traveling of the vehicle 1.

A speed sensor 31 for the vehicle 1, an acceleration sensor 32, and outer cameras 33 may be coupled to the detection ECU 16. The acceleration sensor 32 may detect acceleration of the vehicle 1 due to contact of the vehicle 1. Each of the outer cameras 33 may capture an image of the surroundings of the vehicle 1. The detection ECU 16 may output detection values acquired from the speed sensor 31 and the acceleration sensor 32 of the vehicle 1 and images acquired from the respective outer cameras 33 to the vehicle network 26. The detection ECU 16 may predict contact of the vehicle 1 on the basis of the images from the outer cameras 33, and output a prediction result to the vehicle network 26. The central gateway 27 may relay various kinds of information. The operation ECU 20 may acquire necessary information from the vehicle network 26, and cause an unillustrated display device coupled to the operation ECU 20 to display the information. In addition to the display device, an unillustrated operation device to be operated by the occupant may be coupled to the operation ECU 20.

An inner camera 34 may be coupled to the occupant monitoring ECU 18. The inner camera 34 may capture an image of the occupant who is in present in the vehicle compartment 3 of the vehicle 1. The occupant monitoring ECU 18 may execute various kinds of processes regarding the occupant who is present in the vehicle 1 in accordance with information on the image of the inner camera 34, and acceleration related to contact acquired from the vehicle network 26, for example. The occupant monitoring ECU 18 may output an image, a sound, and any other information or data to the vehicle network 26 if needed.

The external communication ECU 19 may communicate wirelessly with any of a communication base station 81 existing outside the vehicle 1 and a communication device of another vehicle 82, for example. The communication base station 81 and the communication device of the other vehicle 82 may be included in a transportation system 80 together with a server apparatus 83. The external communication ECU 19 may transmit wirelessly information acquired from the vehicle network 26 to the communication base station 81 or the communication device of the other vehicle 82. The transmitted information may be used in the server apparatus 83 and the other vehicle 82, for example. Further, the external communication ECU 19 may receive information from the communication base station 81 and the communication device of the other vehicle 82, and output the received information to the vehicle network 26. This makes it possible for the occupant monitoring ECU 18 of the vehicle 1, for example, to transmit and receive the information or data to and from the server apparatus 83 and the other vehicle 82 outside the vehicle 1 through the external communication ECU 19.

Further, the control system 10 illustrated in FIG. 2 may operate by supplying of electric power from a battery 91 provided in the vehicle 1 to each of the units. Power supply lines from the battery 91 to the respective units may be spread all over the vehicle 1 together with communication cables for the vehicle network 26, for example. Electric power may be supplied to the control system 10 from a power generator or a power receiving device in addition to the battery 91.

Thus, the operation ECU 20 may be coupled to the other control devices including each of the ECUs through the vehicle network 26 in the vehicle 1. In FIG. 2, each of the ECUs other than the operation ECU 20 may be a control device configured to control an operation of the vehicle 1. The external communication ECU 19 may be, however, configured to communicate with the outside of the vehicle 1.

Here, various kinds of devices and operating members thereof may be provided in the vehicle 1 as described above. For example, the start switch, the handle 5, the shift lever 6, the brake pedal 7, and the accelerator pedal 8 for controlling the traveling of the vehicle 1 may be provided in the vehicle 1. Further, operating members for a navigation apparatus, an audio device, an image receiving device, a handsfree calling device, and the other equipment devices may also be provided in the vehicle 1 in addition to the operating members for the devices described above. Thus, a large number of operating members may be provided in the vehicle 1. The large number of operating members may be laid out on an inner surface of the vehicle compartment 3. However, in recent years, the inner surface for layout of the vehicle compartment 3 tends to become insufficient. For example, in a case where it is considered that a game machine, a network communication device, an entertainment device, or any other device may be added thereto, there is a possibility that operating members for these devices cannot further be added in the future.

In particular, for the vehicle 1, development of an automatic driving technology has advanced. In a case where the development advances actually and the vehicle 1 can travel autonomously without the occupant directly controlling the traveling of the vehicle 1, as illustrated in FIG. 1C, the occupant may be allowed to ride the vehicle 1 in a state where the seat 4 is reclined, for example. In this case, when the occupant wants to operate any operating apparatus, the occupant may be required to rise from the seat 4 for an operation and stretch his or her arm to the operating member such as the handle 5 laid out on the inner surface of the vehicle compartment 3 to operate the operating member.

For this reason, development of a new operating apparatus directed to operating of an image projected in the vehicle compartment 3 of the vehicle 1 may be required for the vehicle 1, for example. Hereinafter, a projected object is referred to as an "image object."

Thus, it is also required that the operating apparatuses of the vehicle 1 are further improved.

Figure 3:
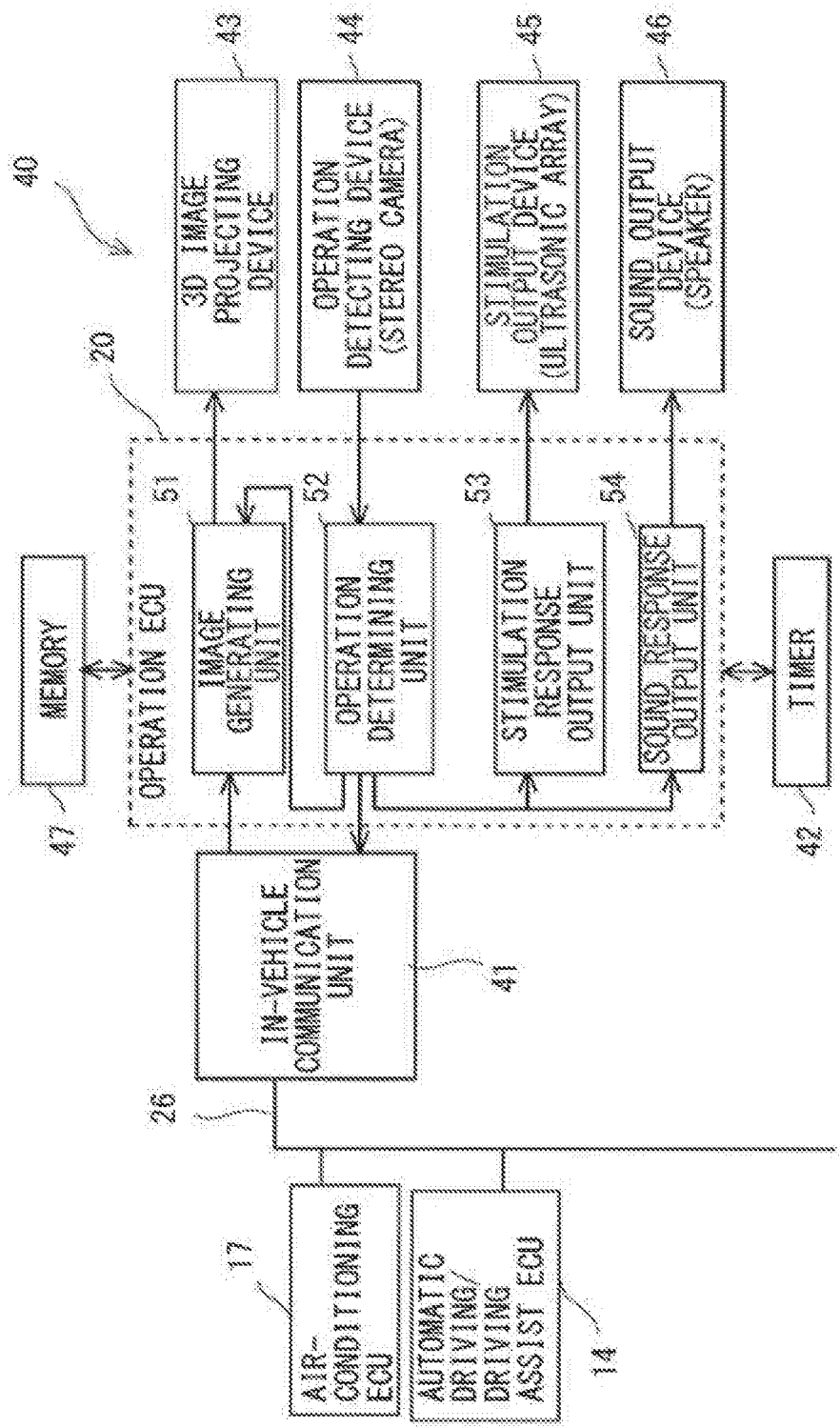
FIG. 3 is a block diagram illustrating an example of a configuration of a non-contact operating apparatus provided in the vehicle illustrated in FIG. 1.

FIG. 3 is a block diagram illustrating a configuration of the non-contact operating apparatus 40 to be provided in the vehicle 1 illustrated in FIG. 1.

The non-contact operating apparatus 40 illustrated in FIG. 3 may include, for example but not limited to, an in-vehicle communication unit 41, a timer 42, a 3D image projecting device 43, an operation detecting device 44, a stimulation output device 45, a sound output device 46, a memory 47, and the operation ECU 20 to which aforementioned devices are coupled.

The memory 47 may be a non-volatile memory, for example, and may be coupled to the operation ECU 20. Programs and data for the non-contact operating apparatus 40 may be stored in the memory 47. The programs may be one in which processes are executed by artificial intelligence (AI). The programs may include a learning program for AI processing. The data contain, for example but not limited to, three-dimensional model data for image to be projected during a non-contact operation. The three-dimensional model data may be image data for the non-contact operation, and contain a plurality of pieces of polygon data that is to be included in a surface of the model, for example.

For example, the operation ECU 20 may be a central processing unit (CPU), or a microcomputer such as an application specific integrated circuit (ASIC) or a digital signal processor (DSP). The operation ECU 20 may read out a program for the non-contact operation from the memory 47, and execute the program. This may implement a control unit of the non-contact operating apparatus 40 in the operation ECU 20. The control unit of the non-contact operating apparatus 40 may control a general operation of the non-contact operating apparatus 40, and implement various kinds of performance for the non-contact operation in the non-contact operating apparatus 40. For example, the operation ECU 20 may implement, as the various kinds of performance for the non-contact operation, an image generating unit 51, an operation determining unit 52, a stimulation response output unit 53, and a sound response output unit 54.

The in-vehicle communication unit 41 may be coupled to the vehicle network 26. As illustrated in FIG. 3, the in-vehicle communication unit 41 may transmit and receive information or data to and from the other control ECU such as the air-conditioning ECU 17 or the automatic driving/driving assist ECU 14 through the vehicle network 26, for example. For example, the in-vehicle communication unit 41 may acquire a display instruction for air conditioning operation image from the air-conditioning ECU 17, and output the display instruction to the operation ECU 20. The in-vehicle communication unit 41 may acquire a display instruction of setting operation image for automatic driving/driving assist from the automatic driving/driving assist ECU 14, and output the display instruction to the operation ECU 20.

The timer 42 may measure an elapsed time or a time. The elapsed time or the time measured by the timer 42 may be outputted to the operation ECU 20.

The image generating unit 51 may acquire the three-dimensional model data from the memory 47 or the in-vehicle communication unit 41 on the basis of the display instruction inputted from the in-vehicle communication unit 41 in order to generate data of image to be projected. The image generating unit 51 may generate a three-dimensional model from the acquired three-dimensional model data. The image generating unit 51 may determine a projected position and a direction of the three-dimensional model in the vehicle compartment 3 when viewed from the occupant, and generate image data for projection from the three-dimensional model (or a stereoscopic model.) The image generating unit 51 may output the image data for projection to the 3D image projecting device 43. The image generating unit 51 may generate a two-dimensional model (or a planar model) from two-dimensional model data, and generate image data for projection. It is to be noted that, even in a case where a display instruction is not inputted from the in-vehicle communication unit 41, the image generating unit 51 may read out display data for content such as a moving image or a still image from the memory 47 or the in-vehicle communication unit 41, generate image data of the content as three-dimensional image (stereoscopic image) or two-dimensional image (planar image), and output the image data to the 3D image projecting device 43.

The 3D image projecting device 43 projects the 3D (three-dimensional) image or the 2D (two-dimensional) image to a space (that is, a predetermined display region) within the vehicle compartment 3 of the vehicle 1. The 3D image projecting device 43 may project an image to a hollow space within the vehicle compartment 3 by a hologram system or a mirror system, for example. Thus, the stereoscopic image may be projected to the projected position of the vehicle compartment 3 so that the occupant is allowed to visually recognize the three-dimensional model.

The operation detecting device 44 detects a predetermined operation site of the occupant. The operation detecting device 44 may include a stereo camera 63 in which two imaging devices are arranged side by side, for example. In this case, the operation detecting device 44 may detect, by the images of the two imaging devices, an operation by a predetermined operation site of the occupant against an image projected in midair of the vehicle compartment 3. Hereinafter, the aforementioned operation by the predetermined operation site of the occupant may be referred to also as an "operation of the occupant," and the aforementioned image projected in midair of the vehicle compartment 3 may be referred to also as "projected image."

The operation determining unit 52 may acquire detected information such as the image of the stereo camera 63 from the operation detecting device 44, for example, and determine the operation of the occupant against the image object in the image projected in the space within the vehicle compartment 3 on the basis of the detected information. The operation determining unit 52 may determine a position and motion of the operation site of the occupant. The motion may include information on motion of the operation site, such as a direction, a speed, or an acceleration of movement. The operation determining unit 52 may acquire a pixel position including a feature of a fingertip of the occupant from the image by AI processing, for example, and generate positional information on the fingertip by a triangulation method for the image of the stereo camera 63. The operation determining unit 52 may generate information on motion of the fingertip, for example, a movement direction, a movement speed, an acceleration of the movement from an imaging result obtained by shifting a time. The operation determining unit 52 may determine the position and the motion of the operation site of the occupant on the basis of the projected position of the image object, and determine the operation of the occupant against the image object projected in the space within the vehicle compartment 3. The operation determining unit 52 may determine, for example but not limited to, presence or absence of contact of the operation site of the occupant against the projected image object, a remaining distance to contact, and a depth to contact. Information related to the presence or absence of contact of the operation site of the occupant against the projected image object, the remaining distance to contact, the depth to contact, and any other suitable information may be hereinafter referred to as "operational information." The operation determining unit 52 may output the determined operational information to the respective units of the operation ECU 20. Namely, the operation determining unit 52 may output the operational information to the image generating unit 51, the stimulation response output unit 53, and the sound response output unit 54. In one embodiment, the operation determining unit 52 and the operation detecting device 44 may serve as a "detecting device." The image generating unit 51 updates the image data for projection in response to the operation of the occupant, and may output the updated image data to the 3D image projecting device 43. Thus, the image to be projected by the 3D image projecting device 43 in the predetermined display region within the vehicle compartment 3 is updated in response to the operation of the occupant.

Further, in a case where it is determined that the operation of the occupant against the image object projected in the space within the vehicle compartment 3 is performed on the basis of the determined operational information, the operation determining unit 52 may output input information based on the operation of the occupant to the respective ECUs of the vehicle 1 through the in-vehicle communication unit 41. In a case where an operation button, which is the image object to be projected, is operated by the operation site of the occupant such as a finger, for example, the operation determining unit 52 may generate input information based on the operation, and output the generated input information to the in-vehicle communication unit 41. Namely, the in-vehicle communication unit 41 may output the input information to the control device through the vehicle network 26.

Figure 4:
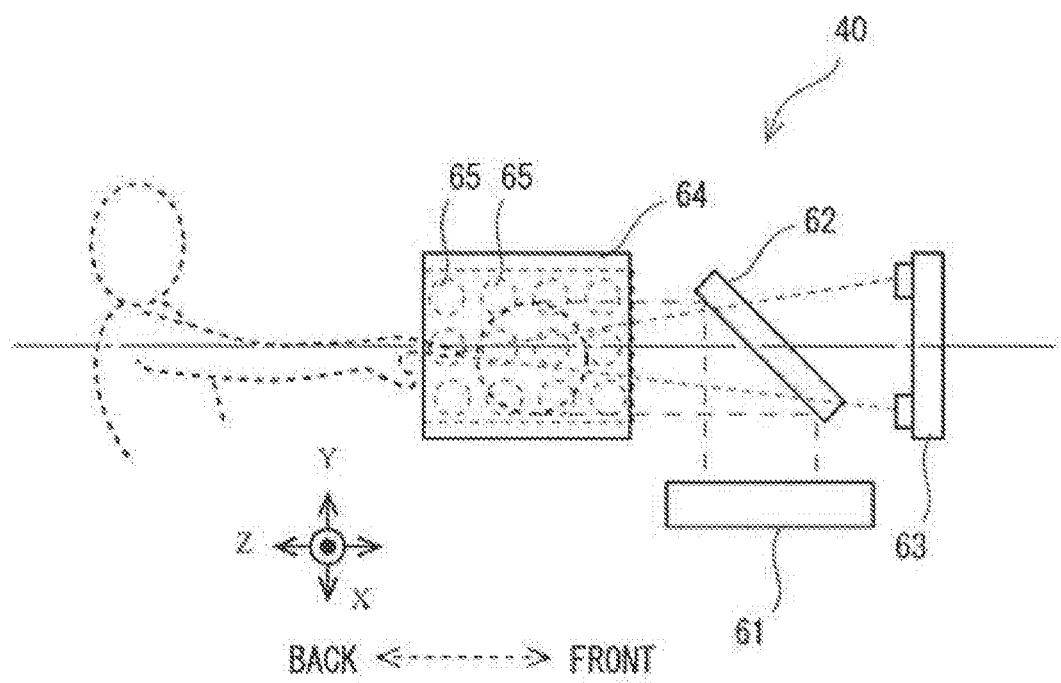
FIG. 4 is an explanatory diagram of one example of arrangement of respective elements of the non-contact operating apparatus illustrated in FIG. 3 in a vehicle compartment.

The stimulation output device 45 may be one that can give a tactile sensation to the operation site of the occupant by an electrical signal, for example. As a device that gives a tactile sensation without contact, there is one that generates a field of ultrasound waves and give a tactile sensation to a skin of an operation site by applying the field of ultrasound waves or variation on the field to the operation site of the occupant, for example. The stimulation output device 45 may include an element array in which a plurality of ultrasonic elements 65 is arranged on a plane apart from a hand downward as illustrated in FIG. 4, for example. By selectively outputting the ultrasound waves from the plurality of ultrasonic elements 65, it is possible to give a tactile sensation to a local site of the hand of the occupant, for example, the fingertip, as if the occupant is touching an object with the local site.

The stimulation response output unit 53 may output an electrical signal to the stimulation output device 45, and cause one or more of the plurality of ultrasonic elements 65 to selectively output ultrasound waves based on the operation. Thus, the stimulation response output unit 53 is allowed to generate an ultrasound field in a predetermined region within the vehicle compartment 3. The stimulation response output unit 53 may locally apply the field of the ultrasound waves or the variation on the field to the operation site of the occupant that is determined to be in contact with the image object by the operation determining unit 52. Here, when a person enters his or her hand into an ultrasound field, for example, the person is allowed to feel the ultrasound field by a skin of a surface of the hand. Thus, the stimulation response output unit 53 may be able to cause the stimulation output device 45 to output, as a response to the operation, a stimulation of a tactile sensation by the ultrasound field to the operation site of the occupant that performs the non-contact operation against the image object projected in the space within the vehicle compartment 3.

In addition, for example, the stimulation output device 45 may include an element array in which a plurality of pressure output elements is arranged. In this case, the stimulation response output unit 53 may control operations of the plurality of pressure output elements separately, whereby a pressure acts on the skin of the person. This makes it possible for the occupant to obtain feeling based on the operation.

The sound output device 46 may be a speaker, for example. The speaker may be driven by a sound signal. The sound output device 46 may output a sound based on the operation of the occupant, for example.

The sound response output unit 54 may output a sound signal to the sound output device 46 to output a sound based on the operation from the sound output device 46. The sound response output unit 54 may select and acquire audio data recorded in the memory 47 in response to the operation of the occupant, and output a sound signal generated from the acquired audio data to the speaker as the sound output device 46. This makes it possible for the occupant to hear various kinds of sounds based on the operation.

FIG. 4 is a diagram for explaining one example of arrangement of the components of the non-contact operating apparatus 40 illustrated in FIG. 3 in the vehicle compartment 3. FIG. 4 also illustrates an occupant who operates an image object by his or her fingertip.

Each of elements of the non-contact operating apparatus 40 may be provided in the vehicle compartment 3 of the vehicle 1.

FIG. 4 is an explanatory diagram schematically illustrating an example of a concrete combination of the 3D image projecting device 43, the operation detecting device 44, and the stimulation output device 45, which are illustrated in FIG. 3.

FIG. 4 illustrates a display screen 61 and a half mirror 62 as the 3D image projecting device 43. Further, FIG. 4 also illustrate the stereo camera 63 as the operation detecting device 44. Moreover, FIG. 4 illustrates an element array as the stimulation output device 45.

The stimulation output device 45 may have a hollow square frame body 64. An element array in which the plurality of ultrasonic elements 65 is regularly arranged, for example, may be provided on each of four surfaces of the square frame body 64. By appropriately causing the element arrays provided on upper, lower, right, and left surfaces of the square frame body 64 to operate, as illustrated in FIG. 4, an ultrasound field may act on a fingertip entering the inside of the square frame body 64. This makes it possible for the occupant to obtain a tactile sensation as if the fingertip is touched by something.

The half mirror 62 may be provided on opposite side of the occupant with respect to the hollow square frame body 64 of the stimulation output device 45. The half mirror 62 may be provided to be inclined by 45° with respect to an axial center of the square frame body 64, which is indicated by a dashed line. The display screen 61 configured to display three-dimensional image (stereoscopic image) or two-dimensional image (planar image) may be arranged under the half mirror 62. The image displayed on the display screen 61 may be reflected by the half mirror 62, whereby the occupant may be allowed to visually recognize the three-dimensional image (stereoscopic image) or the two-dimensional image (planar image) inside the hollow square frame body 64 in the stimulation output device 45. In the first example embodiment, the occupant may be allowed to visually recognize a sphere indicated by a circle in FIG. 4 as the three-dimensional image inside the hollow square frame body 64.

The stereo camera 63 may be provided behind the half mirror 62 when viewed from the occupant, for example. In this case, the two imaging devices of the stereo camera 63 may be provided at respective positions symmetrical with respect to the axial center of the square frame body 64. Thus, the stereo camera 63 may be allowed to capture an image of the finger or the like of the occupant that enters the hollow square frame body 64 of the stimulation output device 45. Hereinafter, as needed, a direction from the axial center of the square frame body 64 toward the occupant may be referred to as a Z direction, and directions perpendicular to the Z direction may be referred to as a Y direction and an X direction. Further, the Z direction may usually be set to a front-back direction of the vehicle 1.

It is to be noted that components of the non-contact operating apparatus 40 illustrated in FIG. 3 are not necessarily arranged together at one place as illustrated in FIG. 4.

For example, in a case where the hollow square frame body 64 of the stimulation output device 45 is arranged in front of the occupant, the hollow square frame body 64 may become an encumbrance to an operation when the occupant operates the handle 5 or the like. As illustrated in FIG. 1, the hollow square frame body 64 may be provided in a square frame form along peripheral surfaces of the vehicle body 2. In this case, there is no need to provide any structural object such as the square frame body 64 in front of the seat 4 on which the occupant sits. Also in this case, as illustrated in FIG. 1 by dotted circles, it is possible to project image at a space within the vehicle compartment 3. Here, an operational region corresponding to the projected image object may be positioned inside the square frame body 64. Further, the hollow square frame body 64 may not necessarily be a square frame shape. In this case, the element array may be arranged along the peripheral surfaces of the vehicle body 2. Alternatively, the element array may be arranged on the inner surface of the vehicle compartment 3 as a whole.

The half mirror 62 may basically be provided on the opposite side to a head of the occupant with respect to the hollow square frame body 64 of the stimulation output device 45. Further, if the image is merely projected in midair inside the square frame body 64, a fully-reflective mirror may be used in place of the half mirror 62. Further, the display screen 61 itself may be arranged on the opposite side of the head of the occupant with respect to the hollow square frame body 64 of the stimulation output device 45. In this case, the half mirror 62 or the fully-reflective mirror may not be required. The half mirror 62 or the fully-reflective mirror and the display screen 61 may be arranged on a toe board or a roof of the vehicle 1, for example.

The detecting device such as the stereo camera 63 may be arranged on a rearview mirror or a back mirror. Further, an image of the vehicle compartment 3 may be captured by an imaging device in an occupant monitoring device such as a display management system (DMS) without providing the stereo camera 63.

The detecting device such as the stereo camera 63 may be any device as long as the device is able to capture an image of an operation site to be detected such as the fingertip of the occupant. Further, a detected medium is not limited to an image. For example, the inside of the vehicle compartment 3 may be scanned by laser, and a fingertip or the like of the occupant may be detected on the basis of a scanning result.

Figure 5:
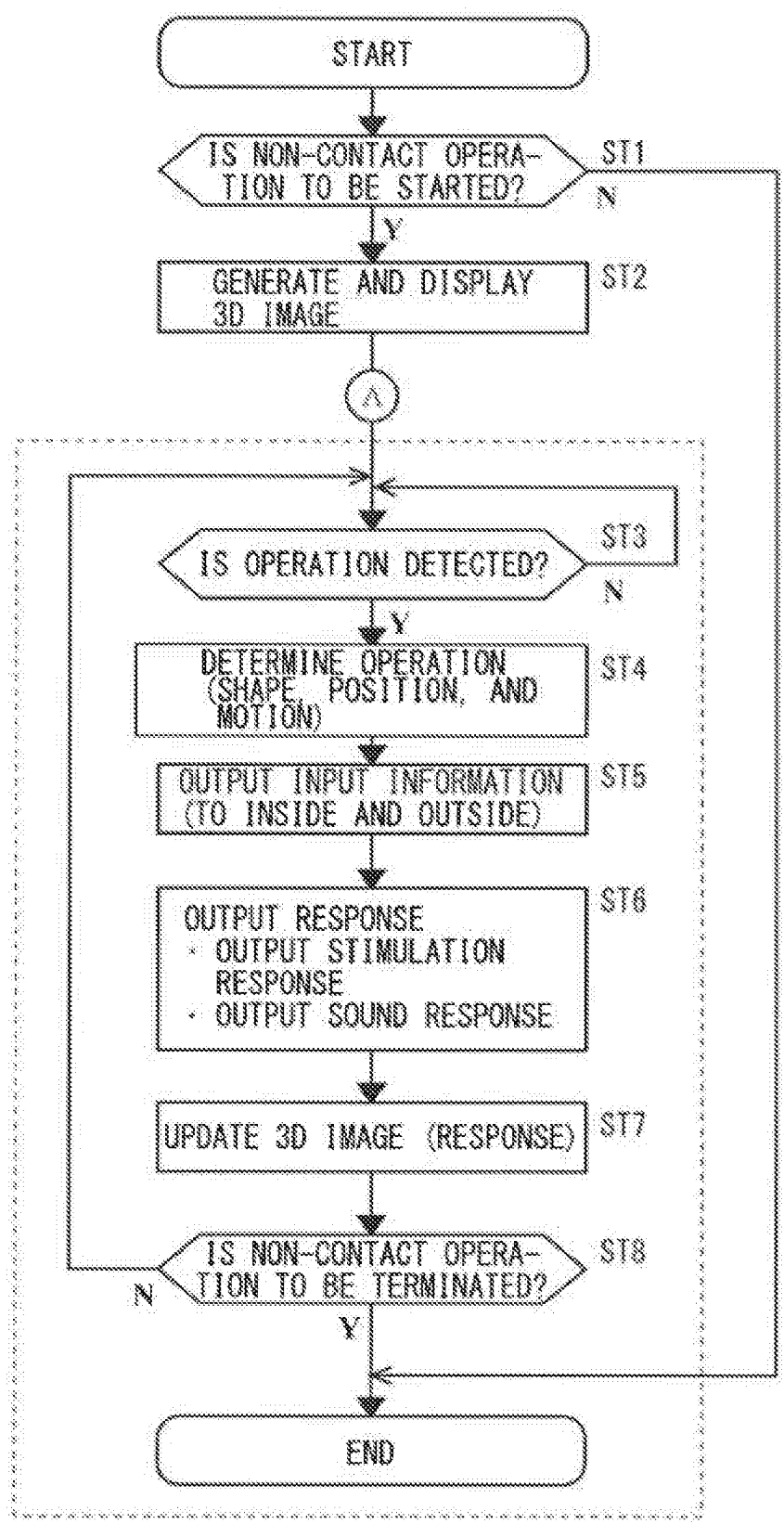
FIG. 5 is a flowchart illustrating an example of a flow of non-contact operation processing according to one example embodiment.

FIG. 5 is a flowchart illustrating a flow of non-contact operation processing according to the first example embodiment.

In Step ST1, the operation ECU 20 may determine whether a non-contact operation by projecting an image is to be started. For example, in a case where a display instruction is inputted from any ECU or in a case where content acquired from the memory 47 or the in-vehicle communication unit 41 is to be displayed (Y in Step ST1), the operation ECU 20 may determine that the non-contact operation is to be started, and cause the processing flow to proceed to Step ST2. Otherwise (N in Step ST1), the operation ECU 20 may determine that the non-contact operation is not to be started, and terminate the non-contact operation processing illustrated in FIG. 5.

In Step ST2, the operation ECU 20 generates, as the image generating unit 51, initial 3D image, and cause the 3D image projecting device 43 to display the 3D image. First, the operation ECU 20 may generate a three-dimensional model from three-dimensional model data acquired from the memory 47 or the in-vehicle communication unit 41, and further generate image data for projection.

The operation ECU 20 may generate the image data for projection from the three-dimensional model on the basis of settings of an initial projected position and an initial display direction of the image, which are set for the three-dimensional model in advance. The operation ECU 20 may temporarily store the generated three-dimensional model in the memory 47. In this case, the operation ECU 20 may read out the three-dimensional model from the memory 47 in a next generating process for updating the image. This makes it possible to generate the image data for projection. The operation ECU 20 may output the generated image data for projection to the 3D image projecting device 43. The 3D image projecting device 43 projects image based on the image data for projection in a space within the vehicle compartment 3. Thus, for example, as illustrated in FIG. 4, the three-dimensional model may be displayed at a predetermined projected position in front of the occupant in a predetermined display direction. As illustrated in FIG. 1B by a dotted circle, the predetermined projected position may be set to a position included in a range, for example, which is reachable by the occupant who sits down on the seat 4 with his or her hand. In a case where the three-dimensional model has orientation, the predetermined display direction may be set to a direction so that a front face of the three-dimensional model faces the occupant, for example.

In Step ST3, the operation ECU 20 determines, as the operation determining unit 52, whether an operation of the occupant against an image object in the image is detected. The operation of the occupant may be acquired from the operation detecting device 44. The operation ECU 20 may acquire detected information such as an image of the stereo camera 63 from the operation detecting device 44, for example, and extract a predetermined operation site of the occupant such as a fingertip of the occupant, for example. The operation ECU 20 may then detect the operation of the occupant against the image object on the basis of variation of a position of the predetermined operation site in the vehicle compartment 3 or presence or absence of motion thereof, for example. In the detection of the operation at this point, the operation ECU 20 may determine that the operation of the occupant against the image is detected even though the operation site of the occupant does not operate the image object. In a case where the operation of the occupant against the image object is not detected (N in Step ST3), the operation ECU 20 may repeat this determination process in Step ST3. In a case where the operation of the occupant against the image object is detected (Y in Step ST3), the operation ECU 20 may cause the processing flow to proceed to Step ST4.

In Step ST4, the operation ECU 20 determines, as the operation determining unit 52, the operation of the occupant against the image object. The operation ECU 20 may first determine whether the operation site of the occupant is in a state where the operation site is in contact with the image object on the basis of a projected position of a surface of the projected image. In a case where it is determined that the operation site is in the state where the operation site is in contact with the image object, the operation ECU 20 may further determine a contact shape, a position and motion (including a direction and a speed) of the operation site. The contact shape may be the number of fingers that are in contact with the image object, or a position of the hand, for example. Moreover, the operation ECU 20 may determine, on the basis of the projected position of the surface of the projected image, a remaining distance until the operation site comes into contact with the image object, or a depth at which the operation site is in contact with the image object.

Further, in a case where it is determined that the operation of the occupant is made against a predetermined image portion, such as a button, of the image object projected in the space within the vehicle compartment 3 on the basis of the operational information determined in this manner, for example, the operation ECU 20 may generate input information on the operation of the occupant.

In Step ST5, the operation ECU 20 may output, as the operation determining unit 52, the determined operational information on the operation of the occupant and the input information on the operation to the inside and the outside of the operation ECU 20. The operation ECU 20 may output the operational information to the image generating unit 51, the stimulation response output unit 53, and the sound response output unit 54 in the operation ECU 20. Further, the operation ECU 20 may output the input information to each unit of the vehicle 1 through the in-vehicle communication unit 41.

In Step ST6, the operation ECU 20 may output a tactile stimulation, a sound, or both as a response to the operation on the basis of the operational information.

The operation ECU 20 may specify, as the stimulation response output unit 53, a position of the operation site of the occupant in the state of being in contact with the image object on the basis of the operational information. The operation ECU 20 may then select the plurality of ultrasonic elements 65 that is to output ultrasound waves so that the ultrasound waves are outputted toward the specified position, and output an electrical signal to the stimulation output device 45. The stimulation output device 45 may output the ultrasound waves from the plurality of ultrasonic elements 65 thus selected. The occupant is allowed to obtain, on the basis of the response by the ultrasound waves, a tactile sensation as if the occupant operates the image object.

The operation ECU 20 may select, as the sound response output unit 54, audio data from the memory 47 in accordance with the motion of the operation site of the occupant, which is in a state where the operation site is in contact with the image object specified on the basis of the operational information, and a contact portion between the operation site and the image object. The operation ECU 20 may then output a sound signal generated from the audio data to the sound output device 46. The sound output device 46 may output a sound based on the sound signal to the vehicle compartment 3. This makes it possible for the occupant to hear, as a response sound against the operation, a different sound based on the motion of the operation site of the occupant and the contact portion between the operation site and the image object.

In Step ST7, the operation ECU 20 updates, as the image generating unit 51, the image data to be projected for the response to the operation of the occupant on the basis of the operational information. The operation ECU 20 may read out the three-dimensional model stored in the memory 47 to update the image data for projection, and output the updated image data to the 3D image projecting device 43. The 3D image projecting device 43 projects the updated image to the space within the vehicle compartment 3. This makes it possible for the occupant to visually recognize that the occupant oneself operates the image object by the operation site on the basis of variation in the projected image. The operation ECU 20 may update the image data to be projected and the output of the stimulation so as to be synchronized with each other in accordance with the same operational information on the operation site of the occupant detected by the operation detecting device 44 and determined by the operation determining unit 52.

In Step ST8, the operation ECU 20 may determine whether the non-contact operation is to be terminated. For example, in a case where outputting of the input information based on the operation is completed, in a case where any new display instruction is not inputted, or in a case where the displayed content is to be terminated, the operation ECU 20 may determine that the non-contact operation is to be terminated (Y in Step ST8), and terminate the processing flow illustrated in FIG. 5. Otherwise (N in Step ST8), the operation ECU 20 may cause the processing flow to return to Step ST3. Thus, the operation ECU 20 may repeat the processes from Step ST3 to Step ST8 until it is determined in Step ST8 that the non-contact operation is to be terminated. During these repeating processes, the operation ECU 20 may appropriately repeat the respective processes of the response by the stimulation to the operation site of the occupant, the response by the sound, and the response by the update of the projected image in response to the operation of the occupant against the image object. Namely, when the projected image is updated in response to the operation, the operation ECU 20 may vary the output of the tactile stimulation by the ultrasound field so as to correspond to the updated projected image.

As described above, in the first example embodiment, the operation ECU 20 generates, as the image generating unit 51, the 3D image to be projected to the vehicle compartment 3 of the vehicle 1, and the 3D image projecting device 43 projects the generated image to the vehicle compartment 3 of the vehicle 1.

Further, the operation detecting device 44 configured to detect the operation of the occupant detects the operation site of the occupant that performs the non-contact operation against the image object projected in the space within the vehicle compartment 3.

The stimulation response output unit 53 may include the element array in which the plurality of ultrasonic elements 65 is arranged, and outputs, as the response to the operation, the tactile stimulation by the ultrasound field to the operation site of the occupant that performs the non-contact operation against the image object projected in the space within the vehicle compartment 3 in accordance with the operational information of the operation site of the occupant determined by the operation determining unit 52. Thus, when the occupant performs the non-contact operation against the image object projected in the space within the vehicle compartment 3, the tactile stimulation by the ultrasound field as the response to the operation may be applied to the operation site that performs the operation.

Further, the operation ECU 20 may update the projected image so as to synchronize the output of the stimulation in accordance with the same operational information of the operation site of the occupant detected by the operation detecting device 44 and determined by the operation determining unit 52. Thus, when the occupant performs the non-contact operation against the image object projected in the space within the vehicle compartment 3, the output of the tactile stimulation by the ultrasound field as the response to the operation may be varied so as to correspond to the updated projected image.

Further, the operation ECU 20 may cause, as the sound response output unit 54, the sound output device 46 to output a different sound to the vehicle compartment 3 in accordance with the motion of the operation site of the occupant and the contact portion of image object on the basis of the same operational information on the operation site of the occupant detected by the operation detecting device 44 and determined by the operation determining unit 52. This makes it possible for the occupant to hear a different sound in response to the operation when the occupant performs the non-contact operation against the image object projected in the space within the vehicle compartment 3.

The response by the combination of these visual sensation, tactile sensation, and auditory sensation allows the occupant to obtain an actual sensation as if the occupant actually performs the operation against the image object projected in the space within the vehicle compartment 3. The occupant may be allowed to operate the image object while having a sensation as if the occupant operates the image object actually.

Furthermore, the occupant may actually operate the operating member against the projected image object in the space within the vehicle compartment 3 in a non-contact manner. Therefore, the occupant may not necessarily be required to operate a structural object while directly touching the structural object, unlike the operating member such as the inner surface of the vehicle compartment 3 or the handle 5, for example. There is no need to provide any operating member that can directly be contacted by the operation site in a space itself, in which the occupant operates the operation site, within the vehicle compartment 3. Therefore, it is possible to improve operability of the occupant without newly arranging any operating member directly operated by the operation site of the occupant near the occupant. Further, by varying display content of the projected image, it is possible to project operation panels while switching into the corresponding operation panel suitable for an operation for each of a plurality of devices.

In particular, in the first example embodiment, the image generating unit 51 and the stimulation response output unit 53 may respectively update the data on the image to be projected (the three-dimensional model or the two-dimensional model) and the output of the stimulation so that the data on the image to be projected and the output of the stimulation are synchronized with each other in accordance with the same operational information on the operation site of the occupant detected by the operation detecting device 44 and determined by the operation determining unit 52. For example, when the image generating unit 51 updates the image data in response to the operation of the occupant, the stimulation response output unit 53 may vary the output of the tactile stimulation by the ultrasound field so as to correspond to the updated image. When a surface shape or a surface position of the image object is varied on the basis of the update of the image data, the stimulation response output unit 53 may update a way or a position of the output of the tactile stimulation by the ultrasound field on the basis of the surface shape or the surface position of the image object after variation. Furthermore, the image generating unit 51 and the stimulation response output unit 53 respectively update the image data and the output of the stimulation in accordance with the same operational information on the operation site of the occupant detected by the operation detecting device 44 configured to detect the operation site of the occupant that performs the non-contact operation against the image object projected in the space within the vehicle compartment 3 and determined by the operation determining unit 52. The stimulation can be varied in accordance with the image itself or variation in the image object. For example, it is possible to cause variation in the stimulation to correspond to the variation in the image object. This makes it more difficult for the occupant to receive a feeling of strangeness due to a difference or a gap between a sensation received from a visual sensation and a sensation received from a tactile sensation. Thus, even after the occupant performs a first operation against an image object, the image data and the stimulation may be varied in response to the operation so as to be synchronized with each other. During an operation after the operation against the image object is started, the occupant may be allowed to continue the operation against the image object that varies in response to the operation while having a sensation as if the occupant actually operates against the image object that varies in response to the operation. By varying the image data and the stimulation so that the image data and the stimulation are synchronized with each other, the occupant may be allowed to continue the operation while having the actual sensation even though the occupant continues to operate an operating member whose which does not really exist in midair.

In contrast, in a case where variation in image data and variation in stimulation are updated without being synchronized with each other, an occupant is allowed to operate an image object while having an actual sensation with respect to a first operation against the image object. However, it is difficult for the occupant to operate the image object while having the actual sensation with respect to subsequent operations.

Second Example Embodiment

Next, a non-contact operating apparatus 40 for a vehicle 1 according to a second example embodiment of the technology will be described. In the second example embodiment, the same reference numeral as that in the first example embodiment may be used for each of the components corresponding to that in the first example embodiment described above, and explanation thereof may be omitted.

Figure 6:
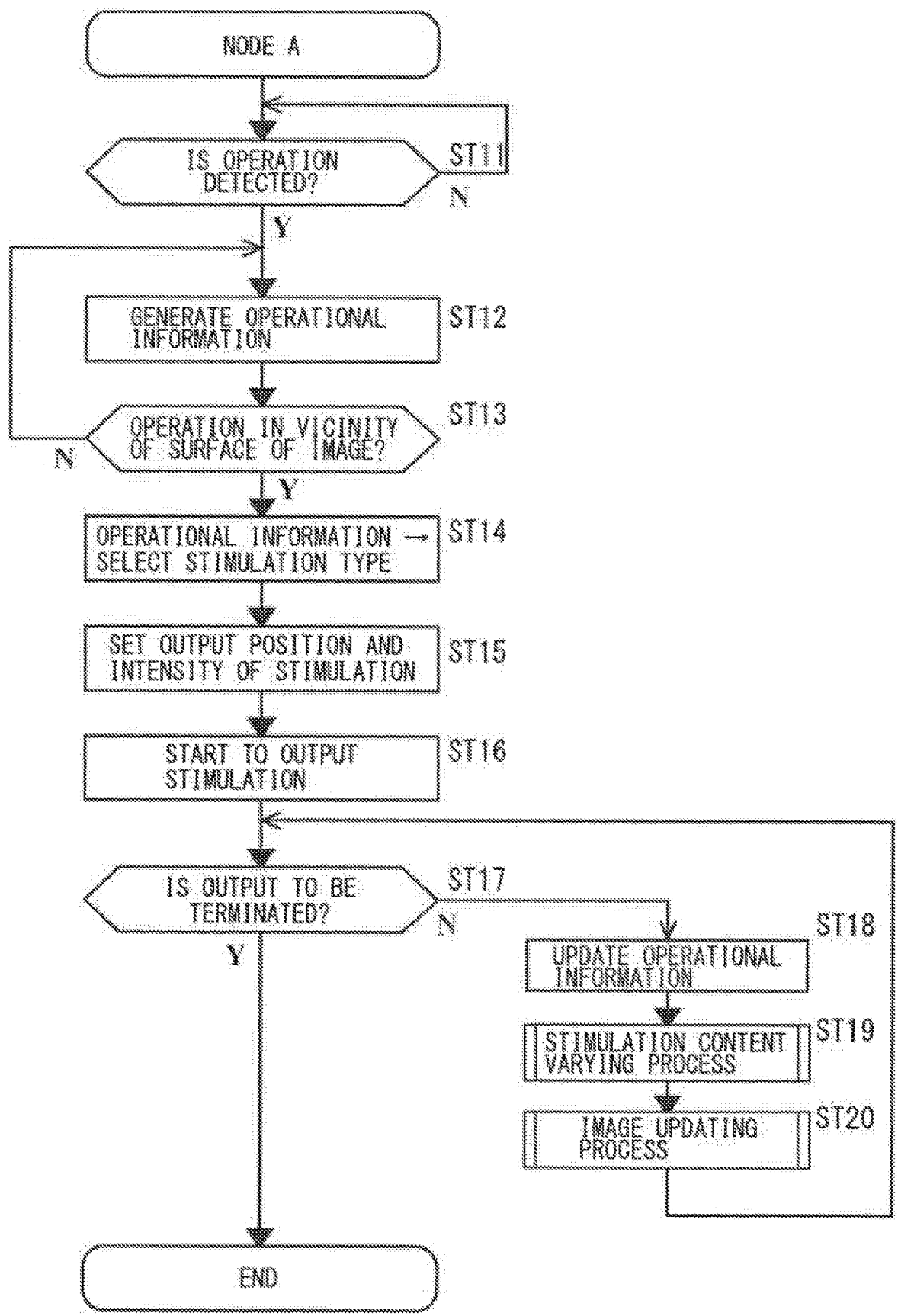
FIG. 6 is a flowchart illustrating an example of a flow of a main part of non-contact operation processing according to one example embodiment.

FIG. 6 is a flowchart illustrating a flow of a main part of non-contact operation processing according to the second example embodiment.

The processes in a dotted frame on a downward side from a node A in FIG. 5 can be replaced by the flowchart illustrated in FIG. 6, for example.

In the second example embodiment, an external communication ECU 19 that is a communication device directed to communication with the outside may receive content data, and the non-contact operating apparatus 40 may acquire the content data from the external communication ECU 19 through a vehicle network 26 to project image. A user may operate against an image object as content. In a case where the content data is acquired from the outside to be projected, in Step ST5 illustrated in FIG. 5, an operation determining unit 52 of the non-contact operating apparatus 40 may not be required to output input information based on an operation to the outside of the non-contact operating apparatus 40.

In Step ST11, an operation ECU 20 may determine presence or absence of an operation of an occupant against image of content (that is, an image object) that has already started to be projected. For example, the operation ECU 20 may acquire information detected from an operation detecting device 44, for example, an image of a stereo camera 63, and extract a predetermined operation site of the occupant, for example, a fingertip. Thereafter, the operation ECU 20 may detect an operation of the occupant against the image object on the basis of variation in a position of the predetermined operation site within a vehicle compartment 3 or presence or absence of motion thereof, for example. In a case where the operation site of the occupant exists near a projected position of the image object, the operation ECU 20 may determine that the operation is detected even though the operation site of the occupant does not operate the image object. In a case where the operation of the occupant against the image object is not detected (N in Step ST11), the operation ECU 20 may repeat this determining process in Step ST11. In a case where it is determined that the operation of the occupant against the image object is detected (Y in Step ST11), the operation ECU 20 may cause the processing flow to proceed to Step ST12.

In Step ST12, the operation ECU 20 may determine, as the operation determining unit 52, the operation of the occupant against the image object, and generate operational information on the basis of a determination result. The operation ECU 20 may determine, as the operational information, presence or absence of the operation of the operation site of the occupant against the image object, a contact shape of the operation site, a position and motion (including a direction and a speed) of the operation site, a remaining distance, and a depth of the contact. The operation determining unit 52 of the operation ECU 20 may output the determined operational information to an image generating unit 51 and a stimulation response output unit 53. If needed, the operation ECU 20 may determine the input information based on the operation on the basis of the operational information, and output the input information to the outside of the operation ECU 20 through the vehicle network 26. In one example, the external communication ECU 19 may acquire the input information based on the operation, and transmit the input information to the outside of the vehicle 1.

In Step ST13, the operation ECU 20 may determine, as the operation determining unit 52, whether the operation of the operation site of the occupant against the image object is an operation on a surface of the projected image or in the vicinity of the surface.

In a case where it is determined that it is not the operation on the surface of the projected image or in the vicinity of the surface (N in Step ST13), the operation ECU 20 may cause the processing flow to return to Step ST12. In a case where it is determined that it is the operation on the surface of the projected image or in the vicinity of the surface (Y in Step ST13), the operation ECU 20 may cause the processing flow to proceed to Step ST14.

In Step ST14, the operation ECU 20 may select, as the stimulation response output unit 53, a type of stimulation to be applied to the operation site of the occupant on the basis of the operational information on the operation on the surface of the projected image or in the vicinity of the surface. The operation ECU 20 may select one type of stimulation on the basis of the operational information this time from a plurality of types of stimulation classified in advance so as to be associated with a plurality of kinds of operational information in the memory 47.

In Step ST15, the operation ECU 20 may set, as the stimulation response output unit 53, an output position and intensity of the stimulation. The operation ECU 20 may set a position of the operation site of the occupant in a state of being in contact with the image object on the basis of the operational information, as the output position of the stimulation. The operation ECU 20 may set output intensity of the stimulation on the basis of the selected type of the stimulation.

In Step ST16, the operation ECU 20 may start, as the stimulation response output unit 53, to output the stimulation. The operation ECU 20 may select one ultrasonic element 65 or a plurality of ultrasonic elements 65 that outputs ultrasound waves toward the position selected in Step ST15, and output an electrical signal to a stimulation output device 45 to output the ultrasound waves corresponding to the output intensity of the stimulation. The stimulation output device 45 may output the ultrasound waves with an output corresponding to the output intensity of the stimulation from the one or the plurality of ultrasonic elements 65 thus selected. The occupant may be allowed to obtain, by the selected stimulation, a tactile sensation as if the occupant touches and operates the image object.

In Step ST17, the operation ECU 20 may determine whether the output of the stimulation is to be terminated. For example, in a case where stoppage of the stimulation output is instructed in the content, or in a case where the content is to be terminated, the operation ECU 20 may determine that the output of the stimulation is to be terminated, and terminate the processing flow illustrated in FIG. 6. Otherwise, the operation ECU 20 may cause the processing flow to proceed to Step ST18.

In Step ST18, the operation ECU 20 may determine, as the operation determining unit 52, a next operation of the occupant against the image object, for example, on the basis of a new image of the stereo camera 63 in the operation detecting device 44 after execution of Step ST11, and update the operational information. The operation ECU 20 may output the determined operational information to the image generating unit 51 and the stimulation response output unit 53.

In Step ST19, the operation ECU 20 may vary, as the stimulation response output unit 53, the content of stimulation on the basis of the updated operational information. Namely, the operation ECU 20 may select a type of stimulation to be applied to the operation site of the occupant on the basis of the updated operational information. Further, the operation ECU 20 may set an output position and intensity of the stimulation, select one ultrasonic element 65 or the plurality of ultrasonic elements 65 to output ultrasound waves, and output an electrical signal to the stimulation output device 45. The stimulation output device 45 may output the ultrasound waves corresponding to the output intensity of the stimulation from the selected ultrasonic elements 65 toward the operation site of the occupant in a state of being in contact with the image object. The occupant may be allowed to obtain variation in the tactile sensation on the basis of the stimulation updated by the operation that the occupant touches the image object.

In Step ST20, the operation ECU 20 updates, as the image generating unit 51, the image to be projected on the basis of the updated operational information. The operation ECU 20 may generate a three-dimensional model processed from content data acquired from the outside, and generate image data for projection from the processed three-dimensional model. The operation ECU 20 may output the updated image data for projection to the 3D image projecting device 43. The 3D image projecting device 43 projects image based on the updated image data for projection in a space (that is, a predetermined display region) within the vehicle compartment 3. Thus, the image with the three-dimensional model projected in front of the occupant may be updated to image that is deformed or moved so as to correspond to the operation of the operation site of the occupant against the image object. Thereafter, the operation ECU 20 may cause the processing flow to return to Step ST17.

The operation ECU 20 may repeat the processes from Step ST17 to Step ST20 until it is determined in Step ST17 that the output of the stimulation is to be terminated. During these repeating processes, the operation ECU 20 may repeat the process to vary the stimulation content against the operation site of the occupant and the process to update the projected image in response to the operation of the occupant against the image object. Thus, when the projected image is updated in response to the operation, the operation ECU 20 may vary an output of a tactile stimulation by an ultrasound field so as to correspond to the projected image thus updated.

Figure 7:
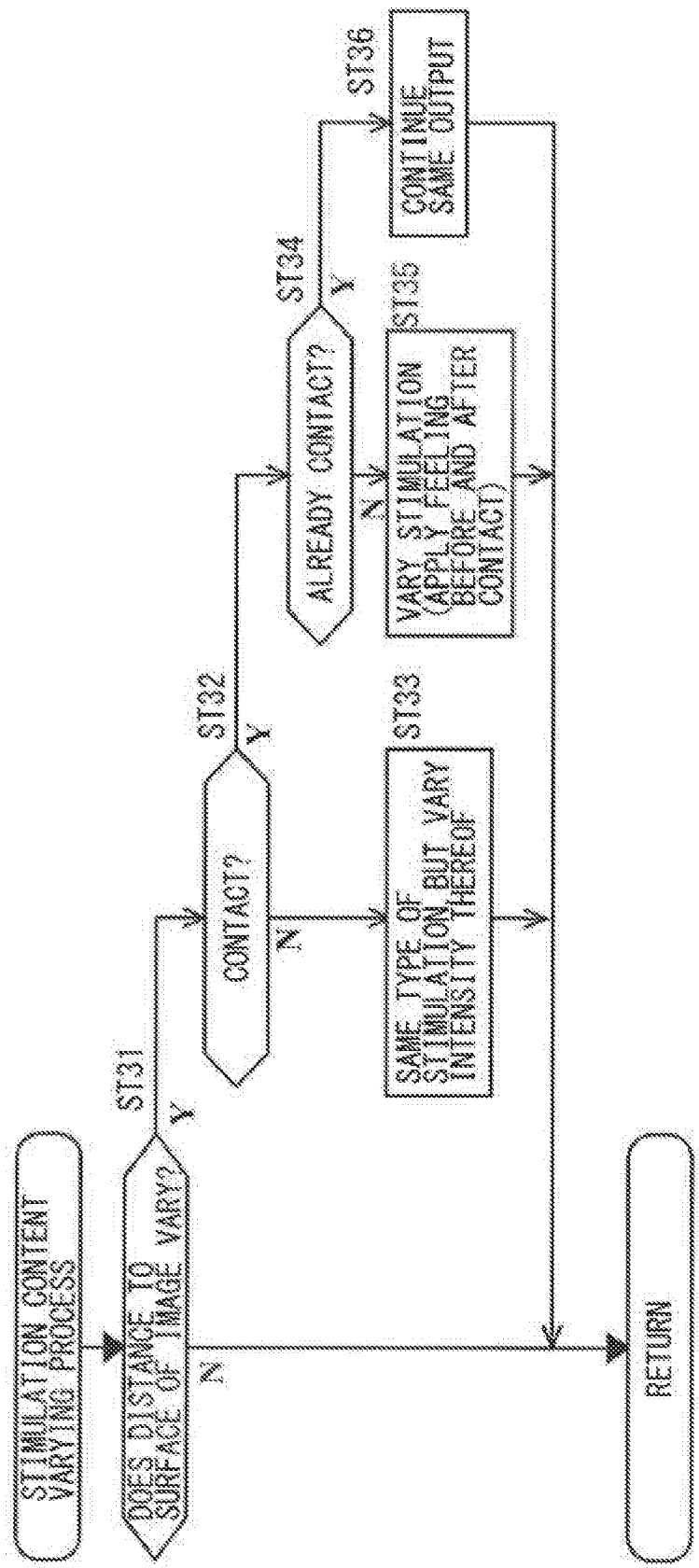
FIG. 7 is a flowchart illustrating an example of a flow of a stimulation content changing process in Step ST19 of FIG. 6.

FIG. 7 is a flowchart illustrating a flow of a stimulation content changing process in Step ST19 of FIG. 6.

In Step ST31, the operation ECU 20 may determine, as the stimulation response output unit 53, whether a distance from the operation site of the occupant to the surface of the projected image varies compared with that before update on the basis of the updated operational information. In a case where it is determined that the distance to the surface of the projected image does not vary (N in Step ST31), the operation ECU 20 may terminate the processing flow illustrated in FIG. 7. In this case, a stimulation response for the tactile sensation does not vary from a state before update of the operational information. In a case where it is determined that the distance to the surface of the image varies (Y in Step ST31), the operation ECU 20 may cause the processing flow to proceed to Step ST32.

In Step ST32, the operation ECU 20 may determine, on the basis of the updated operational information, whether the operation site of the occupant comes into contact with the surface of the image object because of variation of the distance to the surface of the projected image. In a case where it is determined that the operation site does not come into contact with the surface of the image object on the basis of the updated operational information (N in Step ST32), the operation ECU 20 may cause the processing flow to proceed to Step ST33. In a case where it is determined that the operation site comes into contact with the surface of the image object on the basis of the updated operational information (Y in Step ST32), the operation ECU 20 may cause the processing flow to proceed to Step ST34.

In Step ST33, since the operation site of the occupant does not come into contact with the surface of the image object, the operation ECU 20 may maintain the output of the stimulation to the same stimulation. Further, the operation ECU 20 may vary the intensity in accordance with the remaining distance or the depth in the updated operational information. In this case, the stimulation response may be the same type of stimulation before update, but only the intensity thereof may increase or decrease in accordance with the operational information. Thereafter, the operation ECU 20 may terminate the processing flow illustrated in FIG. 7.

In Step ST34, the operation ECU 20 may determine whether the operation site of the occupant has already been in contact with the image object in the operational information before the updated operational information. In a case where it is determined that the operation site of the occupant has not been in contact with the image object yet (N in Step ST34), the operation ECU 20 may cause the processing flow to proceed to Step ST35. In a case where it is determined that the operation site of the occupant has already been in contact with the image object (Y in Step ST34), the operation ECU 20 may cause the processing flow to proceed to Step ST36.

In Step ST35, since the updated operational information this time indicates that the operation site of the occupant starts to be in contact with the image object, the operation ECU 20 may vary the type of stimulation. The operation ECU 20 may select, on the basis of the updated operational information, the type of stimulation to be applied to the operation site of the occupant. Further, the operation ECU 20 may set an output position and intensity of the stimulation, select one or a plurality of ultrasonic elements 65 that outputs ultrasound waves, and output an electrical signal to the stimulation output device 45. The stimulation output device 45 may output the ultrasound waves corresponding to the output intensity of the stimulation from the one or the plurality of ultrasonic elements 65 thus selected toward the operation site of the occupant in a state of being in contact with the image object. The occupant may be allowed to feel that a state of the operation varies from a state where the operation site is not in contact with the image object to a state where the operation site is in contact with the image object on the basis of the stimulation varied as a result of start of the contact with the image object. The occupant may be allowed to obtain the tactile sensations before and after the contact. Thereafter, the operation ECU 20 may terminate the processing flow illustrated in FIG. 7.

In Step ST36, since the operation site of the occupant has already been in contact with the image object, the operation ECU 20 may continue the same type of stimulation. The operation ECU 20 may cause the stimulation output device 45 to output the same type of stimulation with the corresponding output intensity of the stimulation on the basis of the depth of the contact. The occupant may be allowed to obtain a certain tactile sensation with respect to a state where the operation site is in contact with the surface of the image object, a state where the operation site further penetrates the image object, or a state where the operation site is pulled out from the image object. Thereafter, the operation ECU 20 may terminate the processing flow illustrated in FIG. 7.

Figure 8:
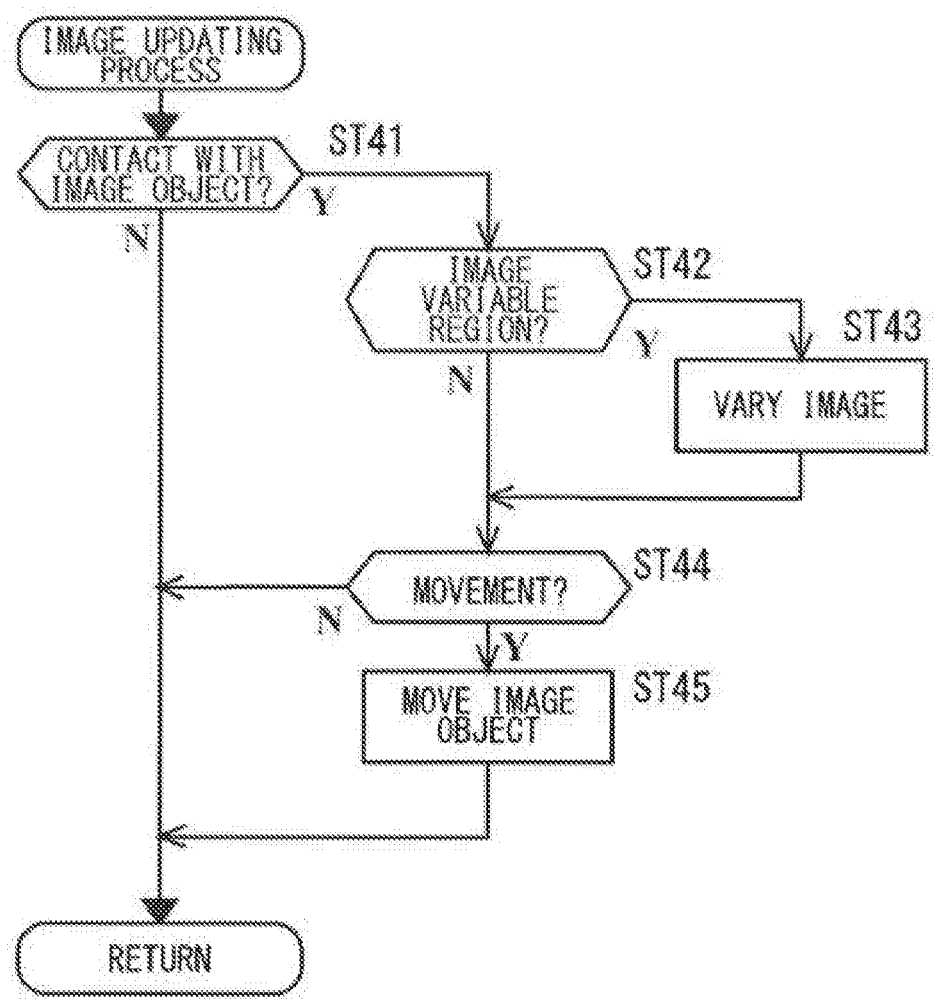
FIG. 8 is a flowchart illustrating an example of a flow of an image updating process in Step ST20 of FIG. 6.

FIG. 8 is a flowchart illustrating a flow of an image updating process in Step ST20 illustrated in FIG. 6.

In Step ST41, the operation ECU 20 may determine, as the image generating unit 51, whether the operation site of the occupant is in contact with the image object on the basis of the updated operational information. In a case where it is determined that the operation site of the occupant is not in contact with the image object (N in Step ST41), the operation ECU 20 may terminate the processing flow illustrated in FIG. 8. In this case, the projected image may not be varied from a state before update of the operational information. Otherwise (Y in Step ST41), the operation ECU 20 may cause the processing flow to proceed to Step ST42.

In Step ST42, the operation ECU 20 may determine, on the basis of the updated operational information, whether a contact portion of the image object with which the operation site of the occupant is in contact is a predetermined region. The predetermined region may be a region in which the image is allowed to be varied, that is, an image variable region. In a case where it is determined that the contact portion of the image object thus contacted is the image variable region (Y in Step ST42), the operation ECU 20 may cause the processing flow to proceed to Step ST43. In a case where it is determined that the contact portion of the image object is not the image variable region (N in Step ST42), the operation ECU 20 may cause the processing flow to proceed to Step ST44.

In Step ST43, the operation ECU 20 may update, on the basis of the updated operational information, the projected image so that the contact portion is deformed in response to the operation of the occupant. The 3D image projecting device 43 projects image based on the updated image data for projection in the space within the vehicle compartment 3. This may deform a shape of the image object with the three-dimensional model projected in front of the occupant so as to correspond to the operation of the operation site of the occupant against the image object. The shape of the image object to be projected may vary in response to the operation of the contacted operation site. Thereafter, the operation ECU 20 may cause the processing flow to proceed to Step ST44.

In Step ST44, the operation ECU 20 may determine, on the basis of the updated operational information, whether there is need to move a position or a direction of the image object. In a case where it is determined that there is no need to move the position or the direction of the image object (N in Step ST44), the operation ECU 20 may terminate the processing flow illustrated in FIG. 8. In a case where it is determined that there is need to move the position or the direction of the image object (Y in Step ST44), the operation ECU 20 may cause the processing flow to proceed to Step ST45.

In Step ST45, the operation ECU 20 may update, on the basis of the updated operational information, the projected image so that the image object is moved or rotated in response to the operation of the contacted operation site. The 3D image projecting device 43 projects image based on the updated image data for projection in the space within the vehicle compartment 3.

Thus, the position or the direction of the image object with the three-dimensional model projected in front of the occupant may be updated so as to correspond to the operation of the operation site of the occupant against the image object. The position or the direction of the projected image object may be varied in response to the operation of the contacted operation site. Thereafter, the operation ECU 20 may terminate the processing flow illustrated in FIG. 8.

According to the operation ECU 20 in the non-contact operating apparatus 40 of the second example embodiment, by such processes, it is possible to achieve the response to the operation against the image object so that the visual sensation and the tactile sensation are coordinated as follows.

For example, the operation ECU 20 may update the projected image in accordance with the contact portion operated by the operation site of the occupant on the basis of deformation of the contact portion of the image object, movement of the image object, or a combination thereof. In a case where the projected image is updated so as to deform the contact portion of the image object, the operation ECU 20 may be allowed to vary an output level of a tactile stimulation by an ultrasound field or a way of output thereof on the basis of the same operational information as one used for update of the image. Further, in a case where the projected image is updated so as to move the image object, the operation ECU 20 may be allowed to shift an output range or an output position of the tactile stimulation by the ultrasound field to the same direction as a movement direction. For example, the operation ECU 20 may be allowed to move the image object and the output of the stimulation along a direction in which the operation site of the occupant moves. Further, the operation ECU 20 may be allowed to move the image object and the output of the stimulation by an amount based on a speed at which the operation site of the occupant moves.

In addition, for example, the operation ECU 20 may be allowed to output different stimulation in accordance with the contact portion or a region in the projected image operated by the operation site of the occupant. The contact portion can be determined on the basis of the projected position of the image object and the operational information. Further, the operation ECU 20 may be allowed to output different stimulation in accordance with the direction and the speed with which the operation site of the occupant moves. The direction and the speed can be determined on the basis of the operational information. The operation ECU 20 may also be allowed to output different stimulation in accordance with gesture of the occupant at a time when the occupant touches the image object. For example, the operation ECU 20 may be allowed to vary the type of the tactile stimulation from the tactile stimulation before variation of a shape to the tactile stimulation after variation of the shape in accordance with the variation of the shape by update of the projected image. Further, the operation ECU 20 may be allowed to increase or decrease the output level of the tactile stimulation from the tactile stimulation before update of the image to the tactile stimulation after update of the image in accordance with variation in a contact amount between the operation site of the occupant and the image object based on update of the projected image.

Next, a concrete example of a combination between image to be projected onto a space in the vehicle compartment 3 and an operation and a response against the image.

Concrete Example 1

The operation ECU 20 projects, by the 3D image projecting device 43, a 3D image of a dog in a space on a dashboard of the vehicle compartment 3.

An occupant may try to stretch his or her hand to the projected image on the dashboard to pet the dog, which is an image object of the 3D image by his or her palm. Hereinafter, the image object of the 3D image may be referred to also as a "3D image object."

The operation ECU 20 detects, by the operation detecting device 44, the palm of the occupant, and may determine a position and motion of the palm that pets the dog of the 3D image on the basis of a position of a surface of the dog of the 3D image.

The operation ECU 20 may cause the stimulation output device 45 to output ultrasound waves toward the determined palm therefrom to apply stimulation to the palm so as to respond to operational information on petting motion of the palm. In addition, the operation ECU 20 may cause the sound output device 46 to output bark of the dog therefrom.

Further, the operation ECU 20 may cause the 3D image projecting device 43 to vary the projected 3D image object of the dog on the basis of the same operational information. The operation ECU 20 may update the projected image in accordance with a contact portion of the image object with which the palm is in contact. The operation ECU 20 may vary the currently-projected 3D image of the dog into 3D image in response to the contact with the contact portion. For example, the operation ECU 20 may update the 3D image of the dog to be projected so as to move in an operation direction of the palm of the occupant.

It is to be noted that, in the series of control, the operation ECU 20 may apply stimulation based on the contact to the palm so as to output ultrasound waves from the stimulation output device 45 to the palm when the palm of the occupant approaches the dog within a predetermined distance on the basis of a surface of the projected dog. In this case, the operation ECU 20 may control the stimulation output device 45 so that the shorter a distance from the palm of the occupant to the surface of the image object becomes, the stronger the stimulation outputted from the stimulation output device 45 toward the palm becomes. The stimulation may be set to the maximum on the surface of the image object.

Thus, the operation ECU 20 may detect the operation against the image object by the palm of the occupant, and update the 3D image of the dog and a stimulation response to a tactile sensation in response to the operation so that the 3D video of the dog and the stimulation response are synchronized with each other. It is possible to synchronize and output the 3D image and a sound field.

Concrete Example 2

The operation ECU 20 projects, by the 3D image projecting device 43, 3D image of a character in a space within the vehicle compartment 3.

An occupant may try to stretch his or her hand to the projected image, and press a stomach of the character in the 3D image by one or more fingers.

The operation ECU 20 detects, by the operation detecting device 44, the fingers of the occupant, and may determine positions and motion of the fingers on the basis of a surface position of a 3D image object.

The operation ECU 20 may cause the 3D image object of the projected character to vary so as to respond to operational information on the determined motion to press the stomach by the finger. The operation ECU 20 may cause the 3D image object to vary in the image so that a contact portion pressed by the finger is dented.

At the same time, the operation ECU 20 may cause the stimulation output device 45 to output ultrasound waves toward a fingertip therefrom on the basis of the same operational information to apply stimulation thereto. The operation ECU 20 may increase an output level of the ultrasound waves in accordance with a penetration depth of the fingertip (a dent amount of image) from the surface position of the image object on the basis of an original surface position before the stomach of the 3D image is pressed, and cause the stimulation output device 45 to output the ultrasound waves therefrom. This makes it possible to give the finger of the occupant a tactile sensation as if the image object is elastically deformed by the finger.

Concrete Example 3

The operation ECU 20 projects, by the 3D image projecting device 43, a 3D image of a character in a space within the vehicle compartment 3. The character may have a hard site and a soft site.

It is to be noted that polygon data may be caused to have a parameter for quality of each portion in image to be projected as one attribute, for example. Further, the operation ECU 20 may independently determine quality of each portion by a method such as AI processing in accordance with a position of each portion in a 3D model.

An occupant may try to stretch his or her hand to the projected image, and press a predetermined position of the character in the 3D image by his or her finger.

The operation ECU 20 detects, by the operation detecting device 44, the finger of the occupant, and determine a position and motion of the finger on the basis of a surface position of a 3D image object.

The operation ECU 20 may cause the 3D image object of the projected character to vary so as to respond to operational information on the determined motion in which the predetermined position is pressed by the finger.

Here, in a case where a site pressed by the finger in the image object is the hard site, the operation ECU 20 may cause the 3D image object of the projected character to vary so that the whole 3D image of the character pressed by the finger is moved in an operation direction of the finger. The operation ECU 20 may cause the 3D image object of the character to move by a movement amount based on a speed and an amount of pressing by the finger.

In a case where the site pressed by the finger in the image object is the soft site, similarly to the concrete example 2, the operation ECU 20 may cause the 3D image object of the projected character to vary so that a contact portion pressed by the finger is dented in the operation direction of the finger. The operation ECU 20 may cause the 3D image object of the corresponding site to be deformed by a dent amount based on the speed and the amount of pressing by the finger.

At the same time, the operation ECU 20 may cause the stimulation output device 45 to output ultrasound waves toward a fingertip therefrom on the basis of the same operational information to apply stimulation thereto.

In a case where the site pressed by the finger in the image object is the hard site, the operation ECU 20 may cause the stimulation output device 45 to output the ultrasound waves to only the fingertip site on the basis of a previous surface position of the 3D image object. The outputted ultrasound waves may rapidly increase in accordance with a penetration amount of the fingertip from a surface position of the image object.

In a case where the site pressed by the finger in the image object is the soft site, the operation ECU 20 may cause the stimulation output device 45 to output ultrasound waves to the whole fingers on the basis of the previous surface position of the 3D image. The outputted ultrasound waves may increase slowly in accordance with the penetration amount of the fingertip from the surface position of the image object.

This makes it possible to give texture of each portion of the projected image to the occupant by a tactile sensation of the finger.

For example, when a hard portion of the projected character is operated, the character may be moved largely at a high speed while being deformed with a small dent. At this time, the operation ECU 20 may be allowed to output stimulation based on this deformation and movement to only the fingertip of the occupant.

Further, when a soft portion of the projected character is operated, the contact portion of the character of the 3D image may be moved slightly at a low speed while being deformed so as to have a large dent. The operation ECU 20 may be allowed to output stimulation based on this deformation and movement to the whole fingers of the occupant.

Thus, by switching the deformation and the movement of the image object on the basis of the contact portion of the occupant against the 3D image object and the motion of the finger (including an operation direction, an operation speed, and an operation amount) and further switching the stimulation so as to differentiate the tactile sensation, it is possible to cause the occupant to recognize a difference of the texture of each portion of the projected image.

Concrete Example 4

The operation ECU 20 projects, by the 3D image projecting device 43, a 3D image of a head of a character in a space within the vehicle compartment 3.

It is to be noted that polygon data may be caused to have an attribute of each portion such as eyes, a nose, a mouth, ears, cheeks, or hair of the head in the image to be projected, for example. Further, the operation ECU 20 may independently determine texture of each portion by a method such as AI processing in accordance with a position of each portion in a 3D model.

An occupant may try to stretch his or her hand to the projected image, and touch the head of the 3D image by his or her palm.

The operation ECU 20 detects, by the operation detecting device 44, the palm of the occupant, and may determine a position and motion of the palm on the basis of a surface position of a 3D image object.

The operation ECU 20 may cause the 3D image object of the head of the projected character to vary so as to respond to operational information on the determined motion of the palm.

For example, in a case where the occupant strokes the hair by the palm, the operation ECU 20 may update the image of the stroked hair so as to cause the hair to wave in a curved surface along a surface of the head in accordance with the motion of the palm.

Further, in a case where the occupant presses the cheek by the finger, the operation ECU 20 may update the image so that the pressed cheek is dented.

At the same time, the operation ECU 20 may cause the stimulation output device 45 to output ultrasound waves toward the palm or the finger therefrom on the basis of the same operational information to apply stimulation thereto.

In a case where the occupant strokes the hair by the palm along the surface (that is, the curved surface) of the head, the operation ECU 20 may cause the stimulation output device 45 to output the weakly-fluctuating ultrasound waves toward the whole palm. This makes it possible for the occupant to obtain a smooth and dry tactile sensation of the waving hair.

In a case where the occupant presses a site of the cheek by the finger substantially perpendicularly to the surface of the head, the operation ECU 20 may cause the stimulation output device 45 to output strong ultrasound waves, which increases while varying in accordance with a penetration amount from a surface position of the cheek, toward a fingertip of the occupant on the basis of an original surface position of the head. The ultrasound waves may be outputted so as to apply an oppressive feeling to the entire circumference of the fingertip. The ultrasound waves may be strengthened steplessly in accordance with a volume of the finger or the palm that enters the image object. The ultrasound waves may be varied in accordance with variation in a shape of the image object. This makes it possible for the occupant to obtain a tactile sensation that the cheek is dented by pressing by the finger.

Thus, by differentiating the stimulation against the palm or the finger in accordance with a contact portion of the occupant with the head of the character and a combination of a contact speed and a contact direction of the palm, it is possible for the occupant to obtain a tactile sensation as if the occupant touches a real head.

The operation ECU 20 may acquire patterns into which a plurality of gestures (ways of operation) is classified for the respective portions of the head from the memory 47, and determine a type of the operation of the occupant against each portion of the head on the basis of these patterns. Further, the operation ECU 20 may classify the contact portions such as skin, clothes, or a fixture in addition to each portion of the head.

Further, the operation ECU 20 may differentiate, for example but not limited to, a period to output the ultrasound waves or a decrease rate of the ultrasound waves in accordance with the gesture such as the way of operation. This makes it possible to differentiate a way to update the stimulation between quick contact and long contact. As strong and short stimulation such as hitting, it is possible to output, as a response, a stimulation that greatly increases or decreases like an impulse. As a weak and long stimulation such as stroking or petting, it is possible to output, as a response, a stimulation that slightly increases or decreases slowly.

Thus, by switching the deformation and the movement of the image object on the basis of the contact portion of the palm or the finger of the occupant with the 3D image of the head of the character and the motion of the palm (including an operation direction, an operation speed, and an operation amount) and further switching the stimulation so as to differentiate the tactile sensation, it is possible for the occupant to recognize a difference of the texture of each portion of the projected image and the content of the operation.

Concrete Example 5

The operation ECU 20 projects, by the 3D image projecting device 43, a 3D image of an arm of a character in a space within the vehicle compartment 3.

It is to be noted that polygon data may be caused to have an attribute of the image to be projected such as a movable range of the arm, for example. Further, the operation ECU 20 may independently determine the attribute of each portion by a method such as AI processing in accordance with a position of each portion in a 3D model.

An occupant may try to stretch his or her hand to a projected image, and move the arm of the character of the 3D image while holding the arm by his or her hand.

The operation ECU 20 detects, by the operation detecting device 44, the hand of the occupant, and may determine a position and motion of the hand on the basis of a surface position of a 3D image object.

The operation ECU 20 may cause the 3D image object of the arm of the projected character to vary so as to respond to operational information on the determined motion of the hand.

For example, in a case where the occupant moves the arm of the character while holding the arm by the hand, the operation ECU 20 may update the projected image in accordance with the position and the motion of the hand so as to move the image of the arm of the character. The operation ECU 20 may update the projected image so as to move the image of the arm within the movable range of the arm.

At the same time, the operation ECU 20 may cause the stimulation output device 45 to output ultrasound waves toward the hand therefrom on the basis of the same operational information to apply stimulation thereto.

For example, in a case where the occupant moves the arm of the character within the movable range, the operation ECU 20 may cause the stimulation output device 45 to output the ultrasound waves based on weight of the arm or resistance to restrict the arm toward the hand therefrom. This makes it possible for the occupant to obtain such a tactile sensation as if the occupant holds the arm with the weight or holds the resisting arm.

In a case where the occupant moves the arm of the character beyond the movable range of the arm, the operation ECU 20 may cause the stimulation output device 45 to output ultrasound waves greater than those outputted within the movable range toward the hand. This makes it possible for the occupant to obtain a tactile sensation with strong reaction force that acts in a case where the arm is forcibly moved beyond the movable range.

Thus, by switching the deformation and the movement of the image object on the basis of a contact portion of the occupant with the arm of the character and the motion of the hand (including an operation direction, an operation speed, and an operation amount) and further switching the stimulation so as to differentiate the tactile sensation, it is possible for the occupant to recognize a difference of texture of each portion of the image and the content of the operation.

Concrete Example 6

The operation ECU 20 projects, by the 3D image projecting device 43, a 3D image of a character or a structural object in a space within the vehicle compartment 3. The character may include, for example but not limited to, a person or an animal whose part can be dented by pressing by a finger. The structural object may include, for example but not limited to, a switch that cannot be dented even by pressing by the finger.

It is to be noted that polygon data may be caused to have an attribute of a type such as the character or the structural object in the image to be projected, for example. Further, the operation ECU 20 may independently determine the type by a method such as AI processing on the basis of a 3D model.

An occupant may try to stretch his or her hand to the projected image, and press a predetermined portion of a predetermined type of image object by his or her finger.

The operation ECU 20 detects, by the operation detecting device 44, the finger of the occupant, and may determine a position and motion of the finger on the basis of a surface position of a 3D image object.

The operation ECU 20 may cause the 3D image object of the projected character to vary in accordance with the type of the projected image so as to respond to operational information on the determined motion of the finger.

For example, in a case where the occupant presses the displayed character by the finger, the operation ECU 20 may update the projected image so that an operation site of the 3D image object of the character is dented in accordance with the position and motion of the finger.

In a case where the occupant presses the structural object such as the displayed switch by the finger, the operation ECU 20 may update the projected image so that the operation site of the 3D image object, which is the structural object, is not dented in accordance with the position and the motion of the finger. The operation ECU 20 may update the projected image so as to vary, for example but not limited to, a color of the switch, for example. In this case, a fingertip operating the 3D image object may get into a back side of a surface of the 3D image object. In a case where the fingertip gets into the back side from the surface of the 3D image object, the operation ECU 20 may display an internal structure of the structural object as a skeleton by shading the color of the switch to become semi-transmissive. The operation ECU 20 may move the 3D image object of the structural object in response to the motion of the finger.

At the same time, the operation ECU 20 may cause the stimulation output device 45 to output ultrasound waves toward the finger therefrom on the basis of the same operational information to apply stimulation thereto.

For example, in a case where the occupant presses the displayed character by the finger, the operation ECU 20 may cause the stimulation output device 45 to output ultrasound waves with intensity based on an amount by which the finger gets in toward the surroundings of the fingertip therefrom on the basis of an original projected position of the character.

In a case where the occupant presses the structural object such as the displayed switch by the finger, the operation ECU 20 may cause the stimulation output device 45 to output ultrasound waves with fixed intensity toward the fingertip therefrom.

Thus, by switching a method of deforming the image object in accordance with the type of the object to be projected by the 3D image and further switching the stimulation so as to differentiate the tactile sensation, it is possible for the occupant to recognize a difference of an operational feeling in accordance with the type of the object to be projected.

As described above, in the example embodiments according to the technology, when the occupant performs an operation against the image object projected in the space within the vehicle compartment 3, the operation ECU 20 of the non-contact operating apparatus 40 may update the projected image on the basis of the operational information, and output the ultrasound waves to the operation site, output a sound, or output both. This makes it possible for the occupant, who performs the non-contact operation against the image object projected in the space within the vehicle compartment 3, to receive a response based on the operation content by the visual sensation, the tactile sensation, and the auditory sensation to obtain a real operational feeling.

Such a non-contact operating apparatus 40 is not only allowed to provide a favorable user interface by the image object of the operating member to the occupant lies at a relaxed state within the vehicle compartment 3 as illustrated in FIG. 1C, for example, but also is used suitably in a case where highly-entertaining content is to be provided to the occupant. The user such as the occupant may receive a different response in accordance with the operation content, whereby it is possible for the user to continuously perform a variety of operations while having an actual sensation of each of the operations.

The specific example embodiments have been described above; however, the described example embodiments are merely examples, and do not limit the scope of the technology. Various kinds of deformations or variations can be made without departing from the subject matter of the technology.

For example, in the example embodiments described above, the non-contact operating apparatus 40 has been provided in a vehicle such as the vehicle 1.

In addition, for example, the non-contact operating apparatus 40 may be provided in the vicinity of furniture or home electric appliances used by the user so as to be associated with them. Further, the non-contact operating apparatus 40 may be provided as a separate apparatus with respect to the vehicle, the furniture, or the home electric appliances, and can be linked to any of the vehicle, the furniture, or the home electric appliances by the user oneself, for example, and installed.

As explained above, the non-contact operating apparatus 40 according to one example embodiment of the technology generates, by the image generating unit 51, the image containing the image object, which is projected in the space within the vehicle compartment 3 of the vehicle 1 by the 3D image projecting device 43, and the 3D image projecting device 43 projects the generated image in the predetermined display region within the vehicle compartment 3 of the vehicle 1. Further, the operation detecting device 44 configured to detect an operation of the occupant detects the operation site of the occupant that performs the non-contact operation against the image object projected in the predetermined display region within the vehicle compartment 3. The stimulation response output unit 53 and the stimulation output device 45 outputs, as the response to the operation of the occupant, the tactile stimulation by the ultrasound field to the operation site of the occupant that performs the operation against the image object projected in the predetermined display region.

Thus, when the occupant performs the non-contact operation against the image object projected in the space within the vehicle compartment 3, the tactile stimulation by the ultrasound field as the response to the operation is given to the operation site that performs the operation. Therefore, the occupant is allowed to obtain such an actual sensation as if the occupant actually performs the operation against the image object projected in the space within the vehicle compartment 3. The occupant is allowed to operate the image object while having a sensation as if the occupant actually performs the operation.

In one embodiment, the image generating unit 51 may serve as a "generating unit." In one embodiment, the vehicle 1 may serve as a "vehicle." In one embodiment, the 3D image projecting device 43 may serve as a "projecting device." In one embodiment, the operating detecting device 44 may serve as a "detecting device." In one example embodiment, the stimulation response output unit 53 and the stimulation output device 45 may serve as a "stimulation response output unit."

Furthermore, the occupant operates the image object that is not actually in contact with the operation site in the space within the vehicle compartment 3. Therefore, the occupant is not required to directly touch and operate the structural object, unlike the inner surface of the vehicle compartment 3 or the operating member such as the handle 5, for example. There is no need to provide any operating member that can be directly contacted by the operation site in the space itself within the vehicle compartment 3, which the occupant actually operates by the operation site.

Therefore, it is possible to improve operability of the occupant against the image object without newly arranging any operating member directly operated by the operation site of the occupant near the occupant.

Further, by varying the projected image object (as the operating member), it is possible to switch and project, for example, an operation panel suitable for an operation of each of a plurality of devices.

In particular, in the non-contact operating apparatus 40 according to one example embodiment of the technology, the image generating unit 51, the stimulation response output unit 53, and the stimulation output device 45 updates the image object and the output of the tactile stimulation in accordance with the operational information on the operation site of the occupant detected by the operation detecting device 44 and determined by the operation determining unit 52. For example, when the image generating unit 51 updates the projected image in response to the operation of the occupant, the stimulation response output unit 53 may vary the output of the tactile stimulation by the ultrasound field so as to correspond to the projected image to be updated. When a surface shape or a surface position of the image object is varied on the basis of update of the image data, the stimulation response output unit 53 may update a way or a position of the output of the tactile stimulation by the ultrasound field on the basis of the surface shape or the surface position of the image object after variation.

Furthermore, the image generating unit 51 and the stimulation response output unit 53 respectively update the image data and the output of the tactile stimulation in accordance with the operational information on the operation site of the occupant detected by the operation detecting device 44 configured to detect the operation site of the occupant that performs the non-contact operation against the image object projected in the space within the vehicle compartment 3 and determined by the operation determining unit 52. The tactile stimulation can be varied in accordance with the image itself or variation in the image object. For example, it is possible for the variation in the tactile stimulation to correspond to the variation in the image object. It is less likely that the occupant receives a feeling of strangeness due to a difference or a gap between a sensation received from a visual sensation and a sensation received from a tactile sensation.

Thus, in the non-contact operating apparatus 40 according to one example embodiment of the technology, even after the occupant performs a first operation against the image object, the image object and the tactile stimulation are varied in response to the operation of the occupant so as to be synchronized with each other.

During an operation after the operation against the image object is started, the occupant is allowed to continue the operation against the image object that varies in response to the operation while having a sensation as if the occupant actually operates against the image object that varies in response to the operation. By varying the image object and the tactile sensation so that the image object and the tactile sensation are synchronized with each other, the occupant is allowed to continue the operation while having the actual sensation even though the occupant continues to operate the image object (as the operating member) which does not really exist in midair.

In contrast, in a case where the variation in the image object and the variation in the tactile sensation are updated so as not to be synchronized with each other, an occupant is allowed to operate an image object while having an actual sensation with respect to a first operation against the image object. However, it is difficult for the occupant to operate the image object while having the actual sensation with respect to subsequent operations.

Each of the drive ECU 11, the steering ECU 12, the brake ECU 13, the automatic driving/driving assist ECU 14, the driving operation ECU 15, the detection ECU 16, the air-conditioning ECU 17, the occupant monitoring ECU 18, the external communication ECU 19, the operation ECU 20, the system ECU 21, and the non-contact operating apparatus 40 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECUs 11 to 21 and the non-contact operating apparatus 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the ECUs 11 to 21 and the non-contact operating apparatus 40 illustrated in FIG. 2.

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A non-contact operating apparatus for a vehicle, comprising:
   a generating unit configured to generate and update image containing an image object;
   a projecting device configured to project the image in a predetermined display region within a vehicle compartment of a vehicle;
   a detecting device configured to detect an operation site of an occupant positioned in a vicinity of the predetermined display region in the vehicle compartment;
   a stimulation output device configured to output a tactile stimulation based on an ultrasound field to the operation site of the occupant;
   a sound output device configured to output a predetermined sound to the vehicle compartment;
   a determining unit configured to determine whether the operation site of the occupant detected by the detecting device performs a non-contact operation against the image object to output a determination result as operational information;
   a sound response output unit configured to cause the sound output device to output the predetermined sound to the vehicle compartment, the predetermined sound corresponding to a motion of the operation site of the occupant against the image object; and
   a stimulation response output unit configured to cause the stimulation output device to output, on a basis of the determination result, the tactile stimulation to the operation site of the occupant as a response to the operation, the occupant performing the non-contact operation against the image object,
   the generating unit and the stimulation response output unit being configured to respectively update the image object and output of the tactile stimulation in accordance with the operational information, and
   when the generating unit updates the image in accordance with the operational information, the stimulation output device varies the output of the tactile stimulation based on the ultrasound field in accordance with the updated image,
   wherein the predetermined display region in an aerial region rearward a steering handle of the vehicle and above a seating surface of a seat which the occupant sits,
   wherein the image projected by the projecting device is a 3D image, and
   wherein the aerial region is above the seat in a state where a seat back of the seat is reclined from a position during manual driving of the vehicle, and an area within which the operation site of the occupant can reach when the occupant is in a posture of leaning against the reclined seat back.

2. The non-contact operating apparatus for a vehicle according to claim 1, wherein
   the generating unit is configured to update the image by deformation of a contact portion of the image object, movement of the image object, or a combination thereof in accordance with the contact portion of the image object operated by the operation site of the occupant,
   the stimulation response output unit is configured to cause the stimulation output device to vary the output of the tactile stimulation based on the ultrasound field in a case where the generating unit updates the image to deform the contact portion of the image object, and
   the stimulation response output unit is configured to cause the stimulation output device to shift the output of the tactile stimulation based on the ultrasound field in a same direction as a movement direction of the image object in a case where the generating unit updates the image to move the image object.

3. The non-contact operating apparatus for a vehicle according to claim 2, wherein the generating unit and the stimulation response output unit are configured to respectively cause the image object and the output of the tactile stimulation to move along a direction in which the operation site of the occupant moves.

4. The non-contact operating apparatus for a vehicle according to claim 2, wherein the generating unit and the stimulation response output unit are configured to respectively cause the image object and the output of the tactile stimulation to move by an amount based on a speed at which the operation site of the occupant moves.

5. The non-contact operating apparatus for a vehicle according to claim 3, wherein the generating unit and the stimulation response output unit are configured to respectively cause the image object and the output of the tactile stimulation to move by an amount based on a speed at which the operation site of the occupant moves.

6. The non-contact operating apparatus for a vehicle according to claim 2, wherein the stimulation response output unit is configured to cause the stimulation output device to output a different type of tactile stimulation in accordance with one or more of the contact portion of the image object operated by the operation site of the occupant, a direction in which the operation site of the occupant moves, and a speed at which the operation site of the occupant moves.

7. The non-contact operating apparatus for a vehicle according to claim 3, wherein the stimulation response output unit is configured to cause the stimulation output device to output a different type of tactile stimulation in accordance with one or more of the contact portion of the image object operated by the operation site of the occupant, a direction in which the operation site of the occupant moves, and a speed at which the operation site of the occupant moves.

8. The non-contact operating apparatus for a vehicle according to claim 4, wherein the stimulation response output unit is configured to cause the stimulation output device to output a different type of tactile stimulation in accordance with one or more of the contact portion of the image object operated by the operation site of the occupant, a direction in which the operation site of the occupant moves, and a speed at which the operation site of the occupant moves.

9. The non-contact operating apparatus for a vehicle according to claim 1, wherein the stimulation response output unit is configured to vary, in accordance with variation of a shape of the image object based on update of the image by the generating unit, a type of the tactile stimulation outputted by the stimulation output device from the tactile stimulation before the variation of the shape to a tactile stimulation after the variation of the shape.

10. The non-contact operating apparatus for a vehicle according to claim 1, wherein the stimulation response output unit is configured to increase or decrease, in accordance with variation of a contact amount between the operation site of the occupant and the image object based on the update of the image by the generating unit, an output level of the tactile stimulation outputted by the stimulation output device from the tactile stimulation before the update of the image to the tactile stimulation after the update of the image.

11. The non-contact operating apparatus for a vehicle according to claim 1, further comprising:
   a sound output device configured to output a sound to the vehicle compartment; and
   a sound response output unit configured to cause the sound output device to output a different sound in accordance with motion of the operation site of the occupant against the image object, a contact portion of the image object, or both, the image object being projected within the vehicle compartment.

12. A vehicle, comprising:
   the non-contact operating apparatus according to claim 1;
   a control device coupled to the non-contact operating apparatus through an internal network, the control device being configured to control an operation of the vehicle; and
   a communication device coupled to the non-contact operating apparatus through the internal network, the communication device being configured to communicate with an outside of the vehicle,
   the non-contact operating apparatus being configured to project content received by the communication device as the image.

13. A non-contact operating apparatus for a vehicle, comprising:
   circuitry configured to control an operation of the non-contact operating apparatus;
   a projecting device configured to project image in a predetermined display region within a vehicle compartment of a vehicle, the image containing an image object;
   a detecting device configured to detect an operation site of an occupant positioned in a vicinity of the predetermined display region in the vehicle compartment;
   a sound output device configured to output a predetermined sound to the vehicle compartment; and
   a stimulation output device configured to output a tactile stimulation based on an ultrasound field to the operation site of the occupant;
   the circuitry being configured to
      generate and update the image,
      determine whether the operation site of the occupant detected by the detecting device performs a non-contact operation against the image object to output a determination result as operational information,
      cause the sound output device to output the predetermined sound to the vehicle compartment, the predetermined sound corresponding to a motion of the operation site of the occupant against the image object;
      cause the stimulation output device to output, on a basis of the determination result, the tactile stimulation to the operation site of the occupant as a response to the operation, the occupant performing the non-contact operation against the image object,
      update the image object and output of the tactile stimulation in accordance with the operational information, and
      when the generating unit updates the image in accordance with the operational information, the stimulation output device varies the output of the tactile stimulation based on the ultrasound field in accordance with the updated image,
   wherein the predetermined display region in an aerial region rearward a steering handle of the vehicle and above a seating surface of a seat which the occupant sits,
   wherein the image projected by the projecting device is a 3D image, and
   wherein the aerial region is above the seat in a state where a seat back of the seat is reclined from a position during manual driving of the vehicle, and an area within which the operation site of the occupant can reach when the occupant is in a posture of leaning against the reclined seat back.

14. The non-contact operating apparatus for a vehicle according to claim 1, wherein
   the image object includes a character of a person or an animal, and
   the sound response output unit is configured to cause the sound output device to output a different sound in accordance with motion of the operation site of the occupant against the character, a contact portion of the character, or both.

15. A vehicle, comprising:
   the non-contact operating apparatus according to claim 14; and
   a control device coupled to the non-contact operating apparatus through an internal network, wherein
   the non-contact operating apparatus is configured to output the operational information to the control device, and
   the control device is configured to control an operation of the vehicle based on the operational information.

16. The non-contact operating apparatus for a vehicle according to claim 1, wherein the seat is a driver's seat.

* * * * *